United States Patent
Takano

(10) Patent No.: US 9,544,780 B2
(45) Date of Patent: Jan. 10, 2017

(54) COMMUNICATION CONTROL APPARATUS, BASE STATION, TERMINAL APPARATUS, AND COMMUNICATION CONTROL METHOD

(71) Applicant: Sony Corporation, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/402,896

(22) PCT Filed: Mar. 14, 2013

(86) PCT No.: PCT/JP2013/057236
§ 371 (c)(1),
(2) Date: Nov. 21, 2014

(87) PCT Pub. No.: WO2013/183331
PCT Pub. Date: Dec. 12, 2013

(65) Prior Publication Data
US 2015/0119064 A1    Apr. 30, 2015

(30) Foreign Application Priority Data
Jun. 5, 2012 (JP) ................................ 2012-128216

(51) Int. Cl.
*H04W 72/00* (2009.01)
*H04W 16/14* (2009.01)
*H04W 28/16* (2009.01)

(52) U.S. Cl.
CPC ............. *H04W 16/14* (2013.01); *H04W 28/16* (2013.01)

(58) Field of Classification Search
CPC ...... H04W 16/14; H04W 28/16; H04W 16/06; H04W 16/10
(Continued)

(56) References Cited

U.S. PATENT DOCUMENTS 6,819,927 B1 * 11/2004 Sato .................... H04B 1/7075
375/E1.003
6,970,498 B1 * 11/2005 Chung .................. H04B 1/001
375/147

(Continued)

FOREIGN PATENT DOCUMENTS

JP    2007-318235 A    12/2007
JP    2008-278263 A    11/2008
(Continued)

OTHER PUBLICATIONS

U.S. Appl. No. 12/883,870, filed Sep. 16, 2010, Takahashi.

(Continued)

*Primary Examiner* — Marceau Milord
(74) *Attorney, Agent, or Firm* — Wolf, Greenfield & Sacks, P.C.

(57) ABSTRACT

There is provided a communication control apparatus including an acquisition unit configured to acquire determination information indicating a result obtained by determining, on the basis of a use status of a frequency band owned by a first operator that provides a radio communication service, whether it is possible for another operator to use the frequency band, and a determination unit configured to determine whether a second operator is allowed to use the frequency band on the basis of the acquired determination information.

16 Claims, 16 Drawing Sheets

(58) Field of Classification Search
USPC .............................. 455/454, 452.1, 450, 509
See application file for complete search history.

(56) References Cited

U.S. PATENT DOCUMENTS

| | | | |
|---|---|---|---|
| 8,452,240 B2 | 5/2013 | Takahashi | |
| 8,533,370 B2* | 9/2013 | Tanaka | H04L 65/1053 710/15 |
| 8,995,942 B2* | 3/2015 | Watanabe | H04W 56/00 455/115.3 |
| 9,258,716 B2* | 2/2016 | Abedi | H04W 16/06 |
| 2002/0186710 A1* | 12/2002 | Alvesalo | H04W 16/14 370/468 |
| 2004/0028003 A1* | 2/2004 | Diener | H04L 1/0001 370/319 |
| 2005/0128971 A1* | 6/2005 | Huschke | H04W 28/26 370/328 |
| 2006/0083205 A1* | 4/2006 | Buddhikot | H04W 16/14 370/338 |
| 2006/0286986 A1* | 12/2006 | Kim | H04W 16/04 455/450 |
| 2009/0052381 A1* | 2/2009 | Gorokhov | H04L 5/0055 370/329 |
| 2009/0191889 A1 | 7/2009 | Abedi | |
| 2010/0172272 A1* | 7/2010 | Tenny | H04W 24/00 370/280 |
| 2010/0202305 A1* | 8/2010 | Wijting | H04W 16/14 370/252 |
| 2010/0265874 A1* | 10/2010 | Palanki | H04B 7/2606 370/315 |
| 2011/0076965 A1 | 3/2011 | Takahashi | |
| 2011/0081870 A1 | 4/2011 | Watanabe | |
| 2011/0106984 A1 | 5/2011 | Tanaka et al. | |
| 2011/0149879 A1* | 6/2011 | Noriega | H04W 72/1236 370/329 |
| 2011/0231302 A1* | 9/2011 | Stanforth | G06Q 10/063 705/37 |
| 2012/0213123 A1* | 8/2012 | Futaki | H04L 5/001 370/254 |
| 2014/0307685 A1 | 10/2014 | Takano | |
| 2015/0110083 A1 | 4/2015 | Takano | |
| 2015/0117348 A1 | 4/2015 | Takano et al. | |
| 2015/0139108 A1 | 5/2015 | Takano | |
| 2015/0156006 A1 | 6/2015 | Takano et al. | |
| 2015/0195064 A1 | 7/2015 | Takano | |
| 2016/0080135 A1 | 3/2016 | Takano et al. | |

FOREIGN PATENT DOCUMENTS

| | | |
|---|---|---|
| JP | 2008-289056 A | 11/2008 |
| JP | 2009-177814 A | 8/2009 |
| JP | 2011-519520 A | 7/2011 |
| JP | 2012-015992 A | 1/2012 |
| JP | 2012-034326 A | 2/2012 |
| WO | WO 2011/052643 A1 | 5/2011 |
| WO | WO 2011/134099 A1 | 11/2011 |

OTHER PUBLICATIONS

U.S. Appl. No. 12/890,768, filed Sep. 27, 2010, Watanabe.
U.S. Appl. No. 12/909,637, filed Oct. 21, 2010, Tanaka et al.
U.S. Appl. No. 14/346,412, filed May 28, 2014, Takano.
U.S. Appl. No. 14/397,906, filed Sep. 30, 2014, Takano et al.
U.S. Appl. No. 14/402,854, filed Nov. 21, 2014, Takano.
U.S. Appl. No. 14/406,364, filed Dec. 8, 2014, Takano.
U.S. Appl. No. 14/409,628, filed Dec. 19, 2014, Takano, et al.
U.S. Appl. No. 14/409,577, filed Dec. 19, 2014, Takano.

* cited by examiner

COMMUNICATION CONTROL APPARATUS, BASE STATION, TERMINAL APPARATUS, AND COMMUNICATION CONTROL METHOD

TECHNICAL FIELD

The present disclosure relates to a communication control apparatus, a base station, a terminal apparatus, and a communication control method.

BACKGROUND ART

High speed cellular radio communication schemes such as Long Term Evolution (LTE) and WiMAX have been put into practical use in recent years, remarkably increasing communication rates of radio communication services for mobile users. Furthermore, the introduction of the fourth generation cellular radio communication schemes such as LTE-Advanced (LTE-A) will be expected to increase communication rates much more.

Meanwhile, more and more applications that require high data rates are used with a rapid increase in the number of mobile users. As a result, the development of cellular radio communication schemes has not yet satisfied all the needs of mobile users. Accordingly, techniques for effective use of frequency resources are developed in order to maintain or increase communication rates.

For example, Patent Literature 1 discloses a technique for helping share communication resources between a plurality of secondary communication services.

CITATION LIST

Patent Literature

Patent Literature 1: JP 2012-34326A

SUMMARY OF INVENTION

Technical Problem

Frequency sharing between different operators does not reveal to a second operator whether a frequency band owned by a first operator can be used, even when the second operator, for example, hopes to use the frequency band. As an example, the second operator does not know which frequency can be used at what timing in which region.

It is then desirable to provide a mechanism that enables an operator to know whether a frequency band of another operator can be used in the frequency sharing between the different operators.

Solution to Problem

According to the present disclosure, there is provided a communication control apparatus including an acquisition unit configured to acquire determination information indicating a result obtained by determining, on the basis of a use status of a frequency band owned by a first operator that provides a radio communication service, whether it is possible for another operator to use the frequency band, and a determination unit configured to determine whether a second operator is allowed to use the frequency band on the basis of the acquired determination information.

Further, according to the present disclosure, there is provided a base station including a radio communication unit configured to wirelessly communicate with a terminal apparatus in a first cell of a first operator by using a frequency band owned by the first operator, the first operator providing a radio communication service, and a control unit configured to, when it is determined whether the second operator is allowed to use the frequency band of each cell on the basis of determination information on each cell indicating a result obtained by determining whether it is possible for another operator to use the frequency band of each cell on the basis of a use status of the frequency band of each cell, and when it is determined that the second operator is allowed to use the frequency band of the first cell, stop use of the frequency band by a terminal apparatus of the first operator in the first cell in accordance with control of a communication control apparatus.

Still further, according to the present disclosure, there is provided a terminal apparatus including a radio communication unit configured to wirelessly communicate with a base station for a first cell of a first operator in the first cell by using a frequency band owned by the first operator, the first operator providing a radio communication service, and a control unit configured to, when it is determined whether the second operator is allowed to use the frequency band of each cell on the basis of determination information on each cell indicating a result obtained by determining whether it is possible for another operator to use the frequency band of each cell on the basis of a use status of the frequency band of each cell, and when it is determined that the second operator is allowed to use the frequency band of the first cell, stop use of the frequency band in the first cell in accordance with control of the base station.

Yet further, according to the present disclosure, there is provided a communication control method including acquiring determination information indicating a result obtained by determining, on the basis of a use status of a frequency band owned by a first operator, whether it is possible for another operator to use the frequency band, the first operator providing a radio communication service, and determining whether a second operator is allowed to use the frequency band on the basis of the acquired determination information.

Furthermore, according to the present disclosure, there is provided a communication control method including wirelessly communicating in a first cell of a first operator by using a frequency band owned by the first operator, the first operator providing a radio communication service, communicating with a communication control apparatus that determines whether a second operator is allowed to use the frequency band of each cell on the basis of determination information on each cell, the determination information on each cell indicating a result obtained by determining, on the basis of a use status of the frequency band of each cell, whether it is possible for another operator to use the frequency band of each cell, and stopping use of the frequency band by a terminal apparatus of the first operator in the first cell in accordance with control of the communication control apparatus when it is determined that the second operator is allowed to use the frequency band of the first cell.

Advantageous Effects of Invention

According to the present disclosure as described above, an operator can know whether a frequency band of another operator can be used in the frequency sharing between the different operators.

DESCRIPTION OF EMBODIMENTS

Figure 1:
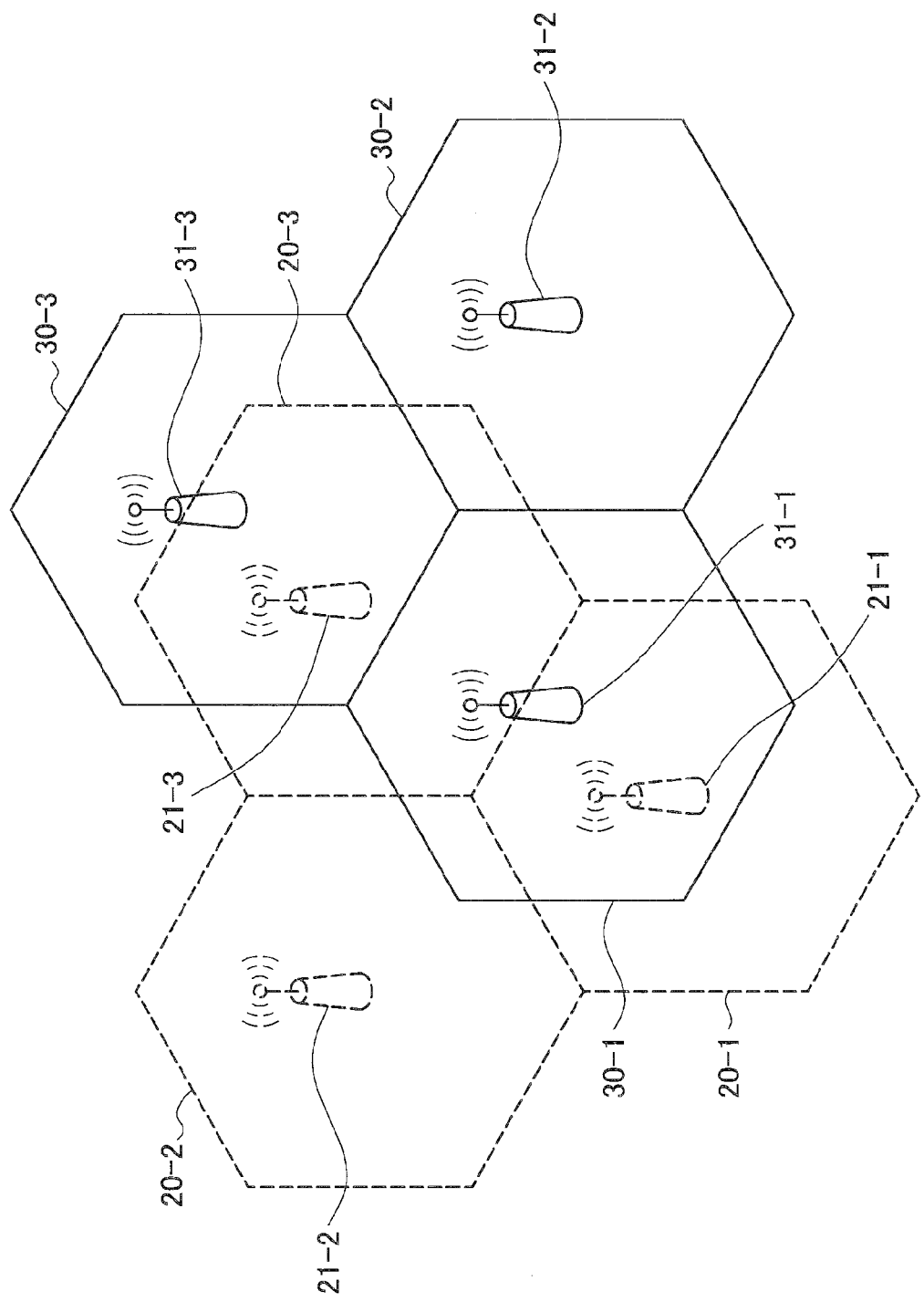
FIG. 1 is an explanatory diagram for describing an example of areas for radio communication services of two operators.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Introduction
  1.1. Technical Field for Effective Use of Frequency Resource
  1.2. Frequency Sharing between Different Operators
  1.3. Overview of Carrier Aggregation
  1.4. Technical Problem
2. Configuration of Radio Communication System
3. Configurations of Apparatuses
  3.1. Configuration of Determination Entity
  3.2. Configuration of eNodeB
  3.3. Configuration of UE
4. Procedure of Processing
  4.1. Determination Processing
  4.2. Processing of Stopping Use
5. Modified Example
6. Conclusion

1. Introduction

First of all, a technical field for effective use of a frequency resource, frequency sharing between different operators, an overview of carrier aggregation, and a technical problem will be described with reference to FIGS. 1 to 7.
<1.1. Technical Field for Effective Use of Frequency Resource>

First of all, the technical field for effective use of a frequency resource will be described. For example, the following technical fields are representative of the technical field for effective use of a frequency resource.
  frequency sharing within a single operator
  frequency sharing between different operators
  frequency secondary use for effectively using a frequency resource in a temporally or spatially idle state
  real-time auction of a frequency resource in an idle state First, frequency sharing within a single operator is a technique of improving utilization efficiency of a frequency resource with the frequency resource leased between communication systems of the same operator in different communication schemes. The different communication schemes are Wideband Code Division Multiple Access (W-CDMA) and Long Term Evolution (LTE) as an example. For example, a rapidly increased traffic volume in a LTE network and a small traffic volume in a W-CDMA network temporarily allow a part of the frequency resource in the W-CDMA network to be used in the LTE network. As a result, it becomes possible to increase the communication capacity of the LTE network, which leads to an increase in the total traffic volumes of both W-CDMA network and LTE network. In other words, it becomes possible to increase the number of terminal apparatuses that can be accommodated in both W-CDMA network and LTE network.

Second, frequency sharing between different operators is a technique of improving utilization efficiency of a frequency resource with the frequency resource leased between communication systems of the different operators. It is assumed in this frequency sharing that different operators (such as an operator A and an operator B) are concurrently providing radio communication services in the same area. For example, the operator A and the operator B each provide a radio communication service of LTE. For example, a rapidly increased traffic volume in a LTE network of the operator B and a small traffic volume in a LTE network of the operator A temporarily allow a part of the frequency resource in the LTE network of the operator A to be used in the LTE network of the operator B. As a result, it becomes possible to increase the communication capacity of the LTE network of the operator B, which leads to an increase in the traffic volume in the LTE network of the operator B.

Third, frequency secondary use for efficiently using a frequency resource in a temporally or spatially idle state is a technique of improving utilization efficiency of a frequency resource with the frequency resource leased between a primary system and a secondary system. The primary system is a main system having priority. For example, the primary system is a radio communication system of LTE. For example, the secondary system is a dedicated radio communication system of LTE including a radio LAN system or a Home eNodeB and a User Equipment (UE) in the neighborhood thereof. For example, when the primary system has a frequency resource unused, the secondary system temporarily uses this frequency resource.

Fourth, real-time auction of a frequency resource in an idle state is a technique of leasing a frequency resource in an idle state at auction to an operator that hopes to use this frequency resource.

Additionally, the present disclosure focuses on the frequency sharing between different operators. The present disclosure describes, for example, a technique required when this technique is applied to a LTE-A platform.

<1.2. Frequency Sharing Between Different Operators>

Next, the frequency sharing between different operators will be described with reference to FIGS. 1 to 5. As discussed above, a frequency resource is leased between communication systems of different operators. It is also assumed that different operators (such as an operator A and an operator B) are concurrently providing radio communication services in the same area.

(Basic Premise)

FIG. 1 is an explanatory diagram for describing an example of an area for radio communication services of two operators. FIG. 1 illustrates cells 20 of an operator A forming an area for a radio communication service of the operator A, and cells 30 of an operator B forming an area for an operator B radio communication service. eNodeBs 21 of the operator A are positioned at the centers of the cells 20 of the operator A, while eNodeBs 31 of the operator B are positioned at the centers of the cells 30 of the operator B. For example, when the eNodeBs 21 of the operator A are arranged in the neighborhood of the eNodeBs 31 of the operator B in this way, the operator A and the operator B concurrently provide radio communication services of LTE-A in the same area. Additionally, eNodeBs are arranged for each operator.

Since the operator A and the operator B are providing the radio communication services in the same area, a frequency band owned by the operator A is different from a frequency band owned by the operator B. This point will be described more specifically below with reference to FIG. 2.

Figure 2:
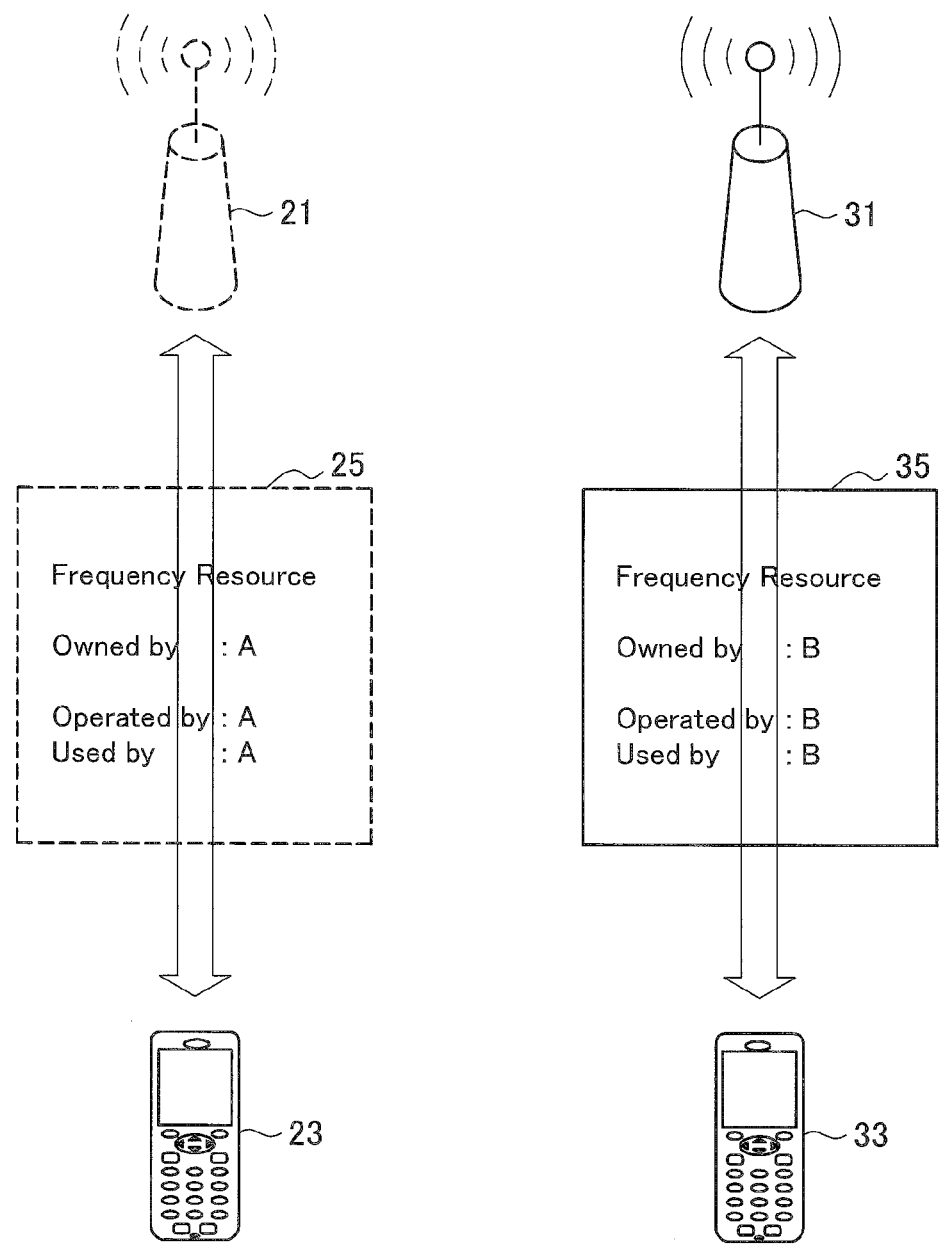
FIG. 2 is an explanatory diagram for describing an example of frequency bands owned by different operators.

FIG. 2 is an explanatory diagram for describing an example of frequency bands each owned by different operators. FIG. 2 illustrates an eNodeB 21 of the operator A, an eNodeB 31 of the operator B, a UE 23 to which the operator A provides a radio communication service, and a UE 33 to which the operator B provides a radio communication service. The operator A owns a frequency band 25, while the operator B owns a frequency band 35. That is, the operator A is allocated the frequency band 25, while the operator B is allocated the frequency band 35.

The frequency band 25 is used for the radio communication of the UE 23 of the operator A in the example of FIG. 2 because no frequency band is leased between different operators. The frequency band 25 is operated by the eNodeB 21 of the operator A. That is, the communication in the frequency band 25 is controlled by the eNodeB 21 of the operator A. Meanwhile, the frequency band 35 is used for the radio communication of the UE 33 of the operator B. The frequency band 35 is operated by the eNodeB 31 of the operator B. That is, the communication in the frequency band 35 is controlled by the eNodeB 31 of the operator B.

(Technique of Leasing Frequency Band)

As a technique of leasing a frequency band, a first technique (which will be referred to as "first leasing technique" below) causes an eNodeB of a lessee operator that has leased a leasehold frequency band to operate the frequency band. Meanwhile, as a technique of leasing a frequency band, a second technique (which will be referred to as "second leasing technique" below) causes an eNodeB of a lessor operator that has leased a leasehold frequency band to operate the frequency band. These leasing techniques will be described more specifically below with reference to FIGS. 3 and 4.

Figure 3:
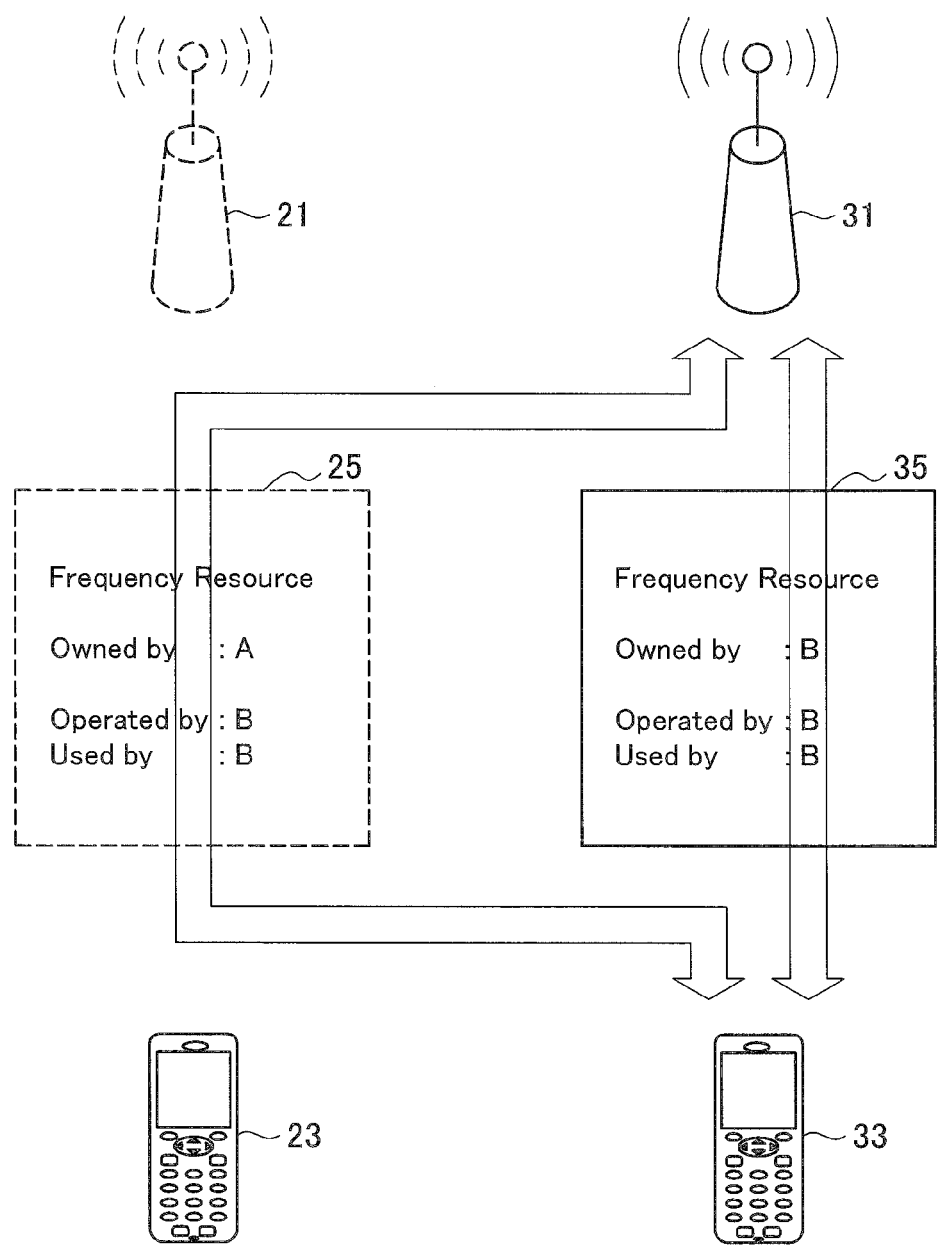
FIG. 3 is an explanatory diagram for describing a first leasing technique in which an eNodeB of a lessee operator that has leased a leasehold frequency band operates the frequency band.

FIG. 3 is an explanatory diagram for describing the first leasing technique of in which an eNodeB of a lessee operator that has leased a leasehold frequency band operates the frequency band. As in FIG. 2, FIG. 3 illustrates the eNodeB 21 of the operator A, the eNodeB 31 of the operator B, the UE 23 of the operator A, and the UE 33 of the operator B. The operator A owns the frequency band 25, while the operator B owns the frequency band 35. Here, the frequency band 25 of the operator A is leased to the operator B. The frequency band 25 is thus used for the radio communication of the UE 33 of the operator B. The leased frequency band 25 is operated by the eNodeB 31 of the operator B, which has leased the frequency band 25. That is, the radio communication of the UE 33 in the frequency band 25 is controlled by the eNodeB 31 of the operator B, and the communication data in the radio communication passes through the eNodeB 31 of the operator B. That is, the first leasing technique leases only a frequency band.

Figure 4:
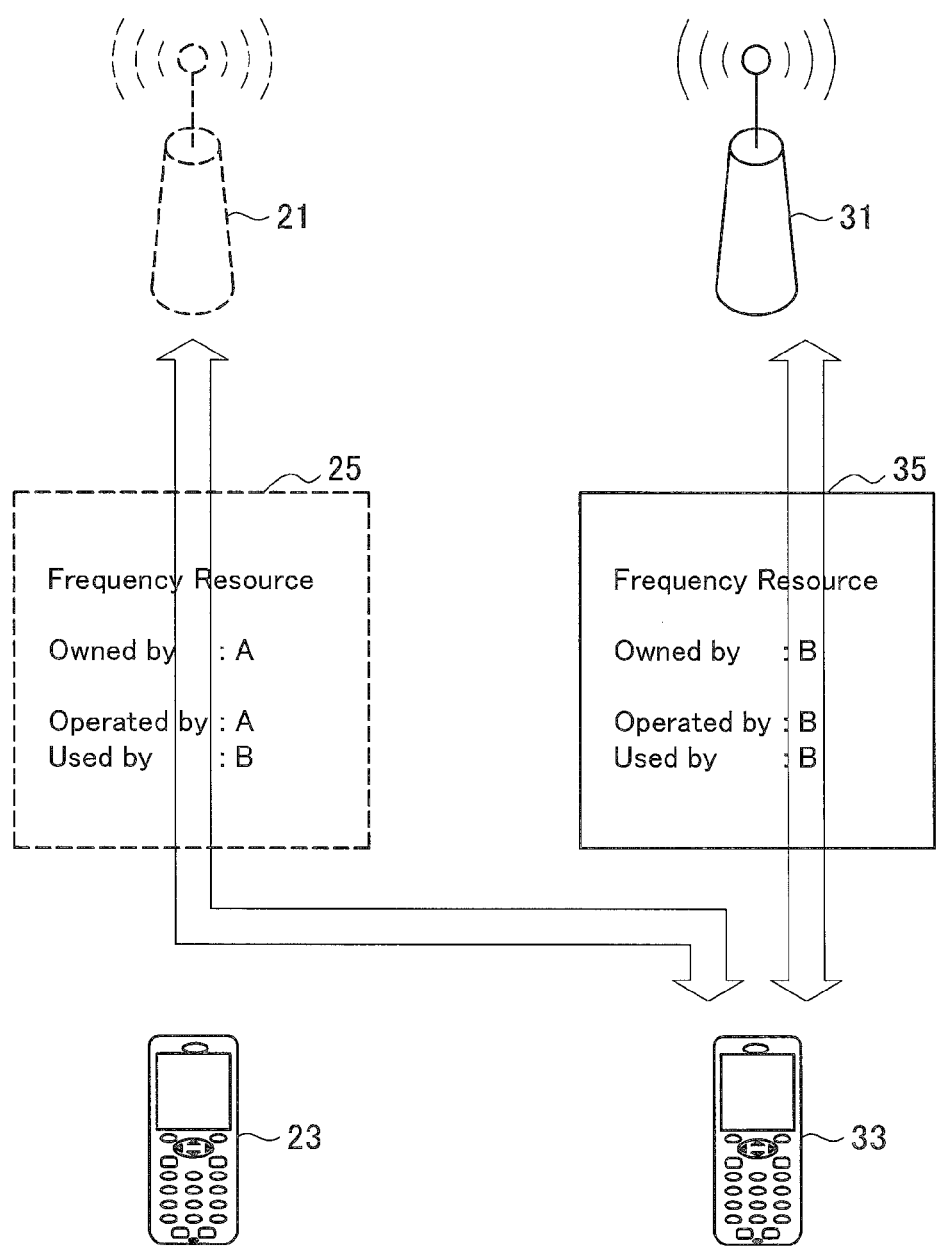
FIG. 4 is an explanatory diagram for describing a second leasing technique in which an eNodeB of a lessor operator that has leased a leasehold frequency band operates the frequency band.

FIG. 4 is an explanatory diagram for describing the second leasing technique of causing an eNodeB of a lessor operator that has leased a leasehold frequency band to operate the frequency band. The frequency band 25 of the operator A is also leased to the operator B. The frequency band 25 is thus used for the radio communication of the UE 33 of the operator B. The leased frequency band 25 is operated by the eNodeB 21 of the operator B, which has leased the frequency band 25. That is, the radio communication of the UE 33 in the frequency band 25 is controlled by the eNodeB 21 of the operator B, and communication data in the radio communication passes through the eNodeB 21 of the operator B. That is, the second leasing technique leases a frequency band, and causes the lessor to operate the frequency band.

(Leasehold Unit of Frequency Resource in Frequency Sharing)

Next, a unit of a frequency resource in the frequency sharing will be described. A component carrier unit, a resource block unit (i.e. unit of twelve consecutive subcarriers), and a subcarrier unit are conceivable as a leasehold unit of a frequency resource. Exchange of detailed information between operators is undesirable, so that lease in CC units seems the easiest.

The release 10 version of the 3rd Generation Partnership Project (3GPP) specifications defines aggregation of up to five component carriers (CC) having a width of 20 MHz or carrier aggregation. For example, such a scenario is assumed on the premise of the carrier aggregation that a CC that is less frequently used among a plurality of CCs owned by an operator is leased to another operator. This point will be described more specifically below with reference to FIG. 5.

Figure 5:
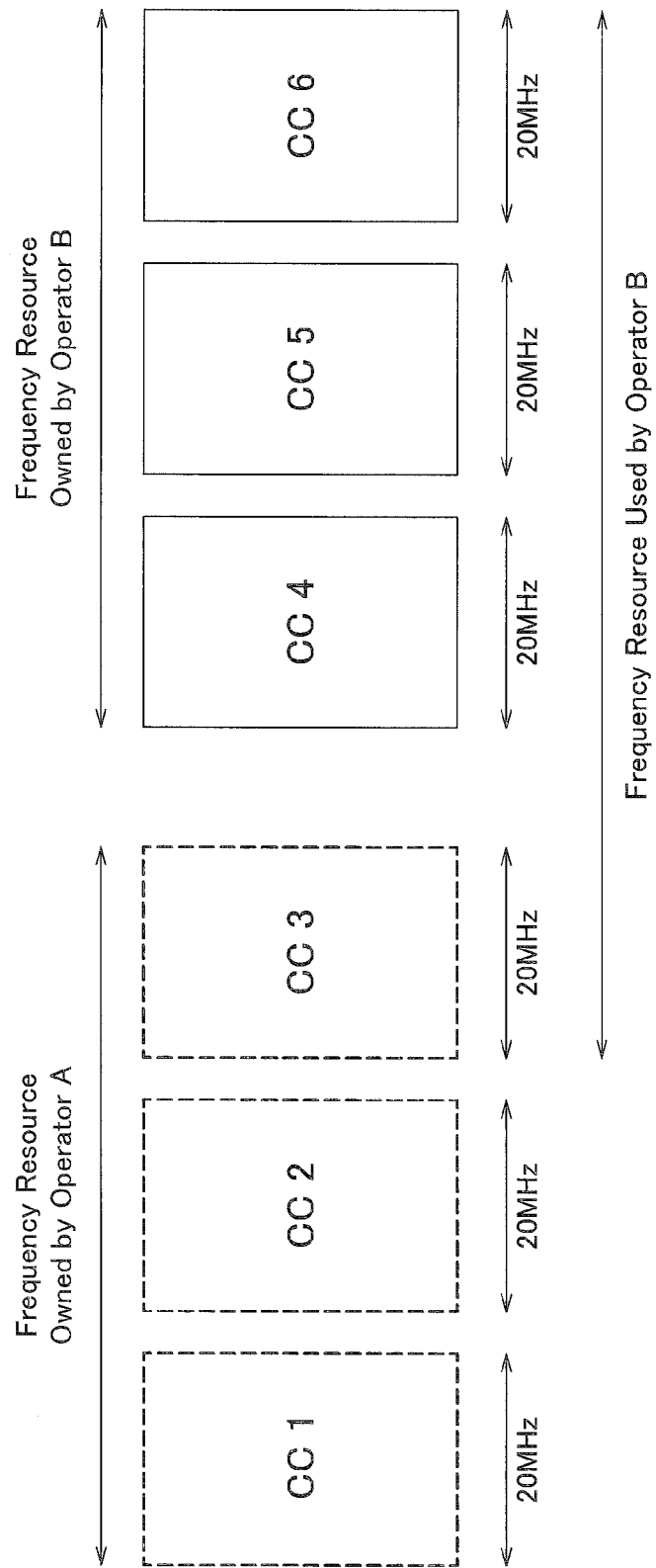
FIG. 5 is an explanatory diagram for describing an example of lease in component carrier units.

FIG. 5 is an explanatory diagram for describing an example of lease in component carrier units. FIG. 5 illustrates a CC 1, a CC 2, and a CC 3 owned by the operator A, and a CC 4, a CC 5, and a CC 6 owned by the operator B. For example, the CC 3 of the CCs owned by the operator A is leased to the operator B. As a result, the operator B (UE 33 of the operator B) uses the four CCs (CC3, CC4, CC5, and CC6).

(Handling of Leased Component Carrier)

When an operator leases a CC to another operator and the other operator (UE of the other operator) uses the CC, it is desirable that a UE of the operator cannot use the CC. For example, while the CC 3 is leased in the example of FIG. 5, it is desirable that the UE 23 of the operator A cannot use the CC 3. This is because when UEs belonging to different operators use one component carrier, various kinds of information need to be exchanged between a radio communication system of the operator A and a radio communication system of the operator B, which is undesirable.

(Frequency Sharing from Viewpoint of UE)

Basically speaking, a serving eNodeB of a UE is supposed to be one eNodeB of one operator. A system that makes a UE conscious of the existence of a plurality of operators seems undesirable because of complexity. It is thus desirable that a CC used seem to be owned by one operator from the viewpoint of a UE.

<1.3. Overview of Carrier Aggregation>

Next, an overview of carrier aggregation will be described with reference to FIGS. 6 and 7.

First of all, component carriers (CCs) include primary component carriers (PCCs) and secondary component carriers (SCCs). A UE uses one PCC, and also uses one or more SCCs as necessary. The PCC of the UE does not have to be a particular CC. That is, the PCC of a UE may be a CC different from the PCC of another UE.

The PCC is a CC used for establishing a connection of a UE. That is, a UE uses any one of CCs for synchronization in a synchronization channel, identification of a cell, acquisition of basic information on a system in a broadcast channel (BCH), and control in a random access channel (RACH) to establish a connection. Any one of the CCs becomes the PCC. The SCC is a CC added to the PCC as necessary.

System information and synchronization signals are transmitted in both PCC and SCCs. The synchronization signals include a primary synchronization signal (PSS) and a secondary synchronization signal (SSS). This makes it possible to use CCs and communicate with a UE supporting the versions prior to the release 9 version of the 3GPP specifications. That is, backward compatibility is ensured.

When the SCC is added as a CC used by a UE in addition to the PCC, it is possible to issue a notification of system information of the SCC by signaling dedicated to the PCC.

PCCs can be changed. That is, the PCC can be changed from a CC to another CC. When the PCC is changed, an eNodeB decides for each UE which CC is desirable as the PCC. When PCCs are changed, a procedure for handover between frequencies is used. When SCCs are added, a UE is notified of system information of the SCCs to be added by signaling via PCCs. Accordingly, the quality of PCCs is important.

Linkage information on a downlink and an uplink is indicated in a system information block (SIB) 2 of system information. When there are a plurality of downlink CCs and a plurality of uplink CCs, linkage information indicates the linkage between the downlink CCs and the uplink CCs. That is, linkage information indicates which downlink CC is paired with which uplink CC.

As an arrangement pattern of Physical Downlink Control Channels (PDCCHs), which are control signals, a first pattern in which PDCCHs are present in the respective CCs and a second pattern in which some CCs have no PDCCHs are conceivable. The second pattern has so-called cross-carrier scheduling applied thereto. The first pattern does not have cross-carrier scheduling applied thereto, which is a normal pattern. This point will be described more specifically below with reference to FIGS. 6 and 7.

Figure 6:
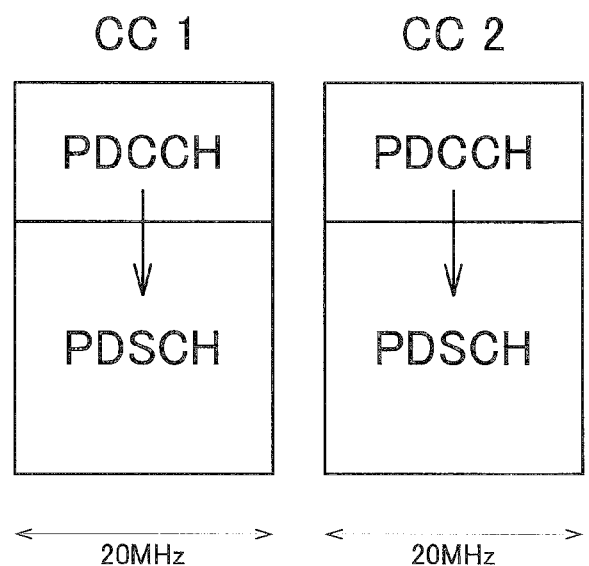
FIG. 6 is an explanatory diagram for describing an example of normally arranged PDCCHs.

FIG. 6 is an explanatory diagram for describing an example of normally arranged PDCCHs. FIG. 6 illustrates the CC 1 and the CC 2 owned by the operator A as illustrated in FIG. 5. Each of the CC 1 and the CC 2 has a PDCCH in this example. Scheduling information on each CC is transmitted in the PDCCH of the CC.

Figure 7:
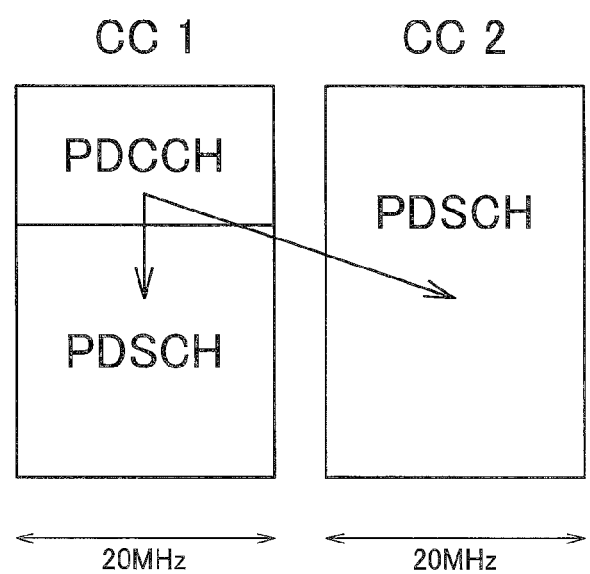
FIG. 7 is an explanatory diagram for describing an example of a PDCCH arranged when cross carrier scheduling is applied.

FIG. 7 is an explanatory diagram for describing an example of a PDCCH arranged when cross carrier scheduling is applied. The CC 1 has a PDCCH, and yet the CC 2 does not have any PDCCH in this example. Scheduling information on the CC 1 and the CC 2 is transmitted in the PDCCH of the CC 1.

The cross carrier scheduling as illustrated in FIG. 7 is an important technique for heterogeneous networks (Het-Nets) because CCs having PDCCHs can be alternate between an eNodeB for a macrocell and an eNodeB for a small cell, for example. The Het-Nets have a problem with interference of a PDCCH of an eNodeB for a macrocell with a PDCCH of an eNodeB for a small cell. Even when an eNodeB for a macrocell and an eNodeB for a small cell are both using the CC 1 and the CC 2, the interference between PDCCHs can be avoided by the eNodeB for the macrocell transmitting the PDCCH only in the CC 1 and by the eNodeB for the small cell transmitting the PDCCH in the CC 2, for example. This is referred to as Carrier Aggregation Based ICIC.

The concept of small cells includes femtocells, nanocells, picocells, microcells, and the like. Small cells are complementary cells for increasing the communication capacity of macrocells, and may be introduced by implementing eNodeBs smaller than eNodeBs for macrocells.

Cross carrier scheduling uses a 3-bit Carrier Indication Field (CIF). The CIF may be quasi-statically set for each UE by Radio Resource Control (RRC) signaling. Additionally, the RRC signaling means transmitting a control signal with a Physical Downlink Shared Channel (PDSCH).

Blind coding of PDCCHs has an upper limit in order to reduce the burdens on UEs. PCCs have an upper limit of 44 Control Channel Elements (CCEs), while SCCs have an upper limit of 32 CCEs.

If PDCCHs and data do not arrived at UEs for a predetermined time, or if UEs are not allocated communication resources for a predetermined time, the UEs automatically deactivate SCCs. The predetermined times are set by eNodeBs.

This is the overview of the carrier aggregation in the release 10 version of the 3GPP specifications.

<1.4. Technical Problem>

A technical problem with implementation of the frequency sharing between different operators as discussed above will be described. It will be described as an example that the frequency sharing is implemented on a LTE-A platform to which the technique for the carrier aggregation in the release 10 version is applied.

Referring to FIGS. 1, 2, and 5 again, let us assume that the operator B hopes to use any frequency band 25 (that is, CC 1, CC 2, or CC 3) owned by the operator A, for example. More specifically, a rapidly increased traffic volume of a radio communication network of the operator B and a small traffic volume of a radio communication network of the operator A make the radio communication system of the operator B hope to use the frequency band 25 owned by the operator A in order to increase the bandwidth.

Even in this case, the radio communication system of the operator B does not, however, know whether the frequency band 25 owned by the operator A can be used. As an example, the communication system of the operator B does not know which of CCs (CC 1, CC 2, or CC 3) owned by the operator A can be used at what timing (from what time to what time). Further, when CCs are leased in cell units, the radio communication system of the operator B does not know even which cell 20 of the operator A has a CC that can be used.

An embodiment of the present disclosure allows an operator to know whether a frequency band of another operator can be used in the frequency sharing between the different operators. Specific content will be described below for <<2. Configuration of Communication System>>, <<3. Configurations of Apparatuses>>, <<4. Procedure of Processing>>, and <<5. Modified Example>>.

2. Configuration of Communication System

Figure 8:
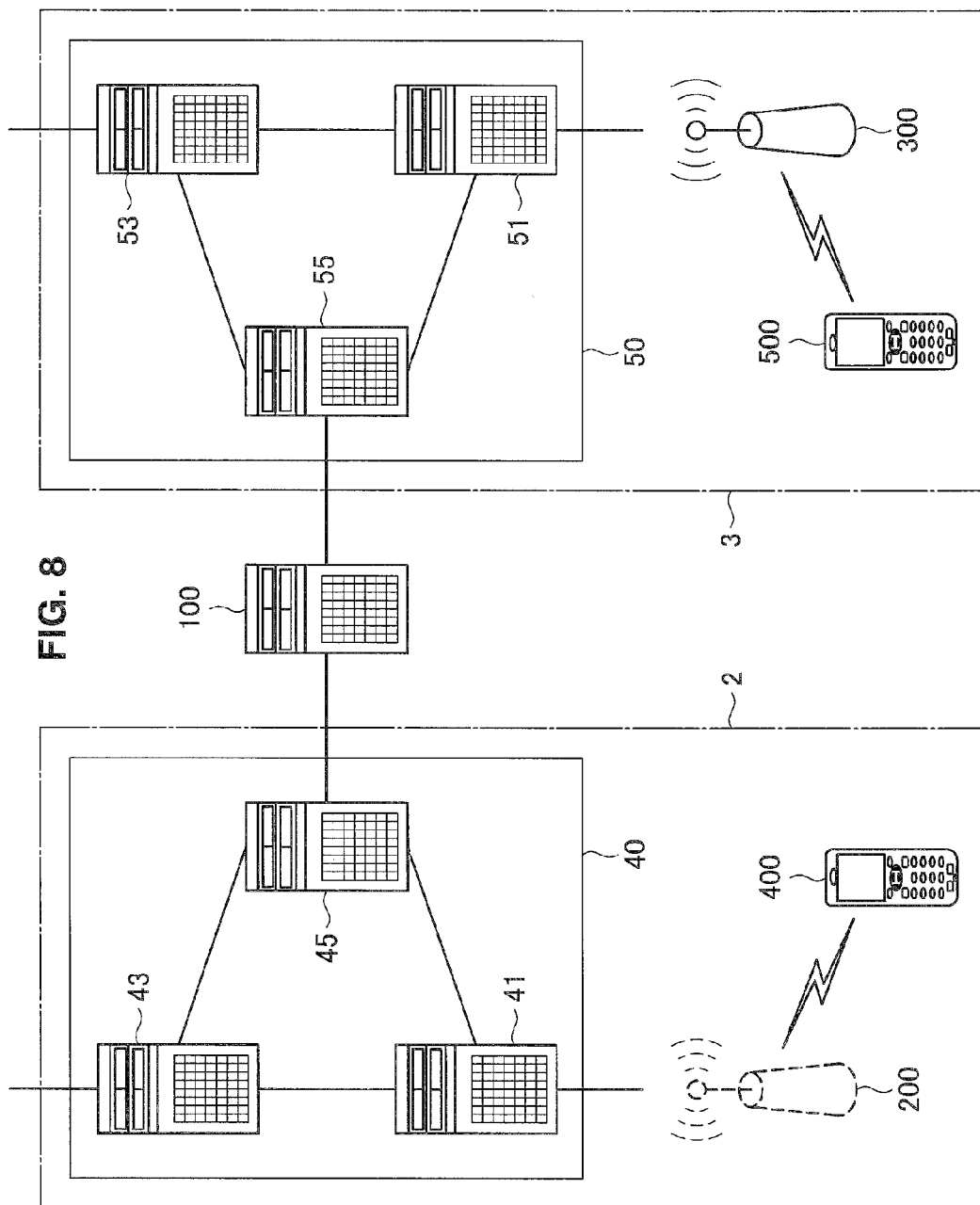
FIG. 8 is an explanatory diagram illustrating an example of a schematic configuration of a radio communication system according to an embodiment.

First of all, a schematic configuration of a communication system 1 according to an embodiment of the present disclosure will be described with reference to FIG. 8. FIG. 8 is an explanatory diagram illustrating an example of the schematic configuration of the communication system 1 according to the present embodiment. FIG. 8 shows that the communication system 1 includes a radio communication system 2 of the operator A, a radio communication system 3 of the operator B, and a determination entity 100.

(Radio Communication System 2 of Operator A)

The radio communication system 2 of the operator A is, for example, a radio communication system of LTE. The radio communication system 2 includes an Evolved Packet Core (EPC) 40, an eNodeB 200, and a UE 400.

The EPC 40 further includes a Serving Gateway (S-GW) 41, a Packet Data Network Gateway (P-GW) 43, and a Mobility Management Entity (MME) 45. The S-GW 41 is connected to one or more eNodeBs to route a user data packet, transfer a user data packet, and the like. Meanwhile, the P-GW 43 is connected to an external packet data network to transfer a user data packet between the EPC and the external packet data network. The MME 45 is connected to the one or more eNodeBs 200 to manage the position of the UE 400, authenticate the UE 400, and the like.

The eNodeB 200 operates the frequency band 25 owned by the operator A. That is, the eNodeB 200 controls the communication in the frequency band 25, and uses the frequency band 25 to wirelessly communicate with the UE 400 of the operator A.

When the first leasing technique (a frequency band is operated by an eNodeB of a lessee operator) is used as a technique of leasing a frequency band, and when the frequency band 35 of the operator B is leased to the operator A, the eNodeB 200 operates the frequency band 35. The eNodeB 200 then uses the frequency band 35 to wirelessly communicate with the UE 400 of the operator A.

When the second leasing technique (a frequency band is operated by an eNodeB of a lessor operator) is used as a technique of leasing a frequency band, and when the frequency band 25 of the operator A is leased to the operator B, the eNodeB 200 wirelessly communicates with a UE 500 of the operator B by using the frequency band 25.

The UE 400 wirelessly communicates with the eNodeB 200 of the operator A by using the frequency band 25 owned by the operator A.

When the first leasing technique (operation by an eNodeB of a lessee operator) is used as a technique of leasing a frequency band, and when the frequency band 35 of the operator B is leased to the operator A, the UE 400 wirelessly communicates with the eNodeB 200 of the operator A by using the frequency band 35 owned by the operator B.

When the second leasing technique (operation by an eNodeB of a lessor operator) is used as a technique of leasing a frequency band, and when the frequency band 35 of the operator B is leased to the operator A, the UE 400 wirelessly communicates with an eNodeB 300 of the operator B by using the frequency band 35 owned by the operator B.

(Radio Communication System 3 of Operator B)

The radio communication system 3 of the operator B is, for example, a radio communication system of LTE. The radio communication system 3 includes an Evolved Packet Core (EPC) 50, the eNodeB 300, and the UE 500. For example, each apparatus in the radio communication system 3 of the operator B functions in the same way as the corresponding apparatus in the radio communication system 2 of the operator A.

(Determination Entity 100)

The determination entity 100 determines the lease of a frequency band between different operators. A specific operation of the determination entity 100 will be described later in detail.

The example of the configuration of the communication system 1 according to the embodiment of the present disclosure has been described so far with reference to FIG. 8. The embodiment of the present disclosure allows the operator B to know whether a frequency band of the operator A can be used in the frequency sharing between the operator A and the operator B, and further allows the operator A to know whether a frequency band of the operator B can be used in the same way. Specific content will be described below for <<3. Configurations of Apparatuses>>, <<4. Procedure of Processing>>, and <<5. Modified Example>>.

3. Configurations of Apparatuses

Figure 9:
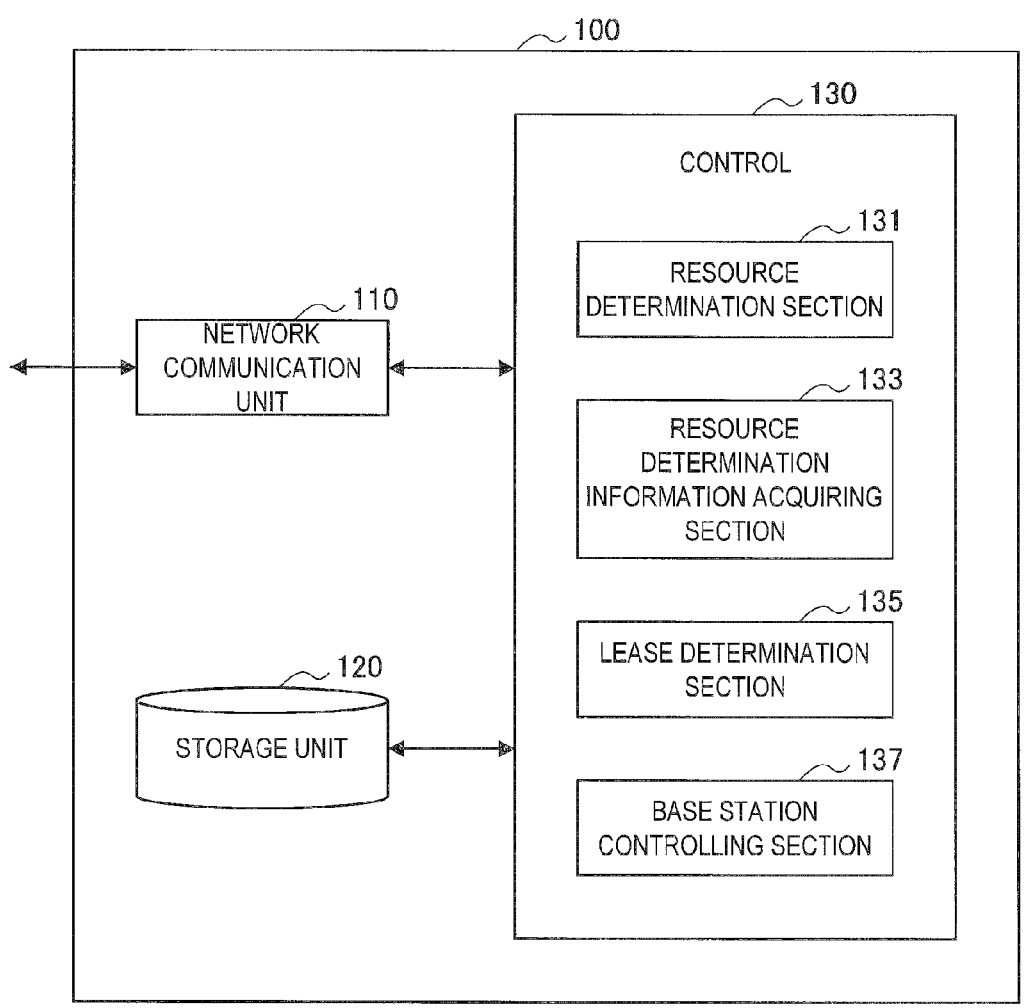
FIG. 9 is a block diagram illustrating an example of a configuration of a determination entity according to an embodiment.
Figure 10:
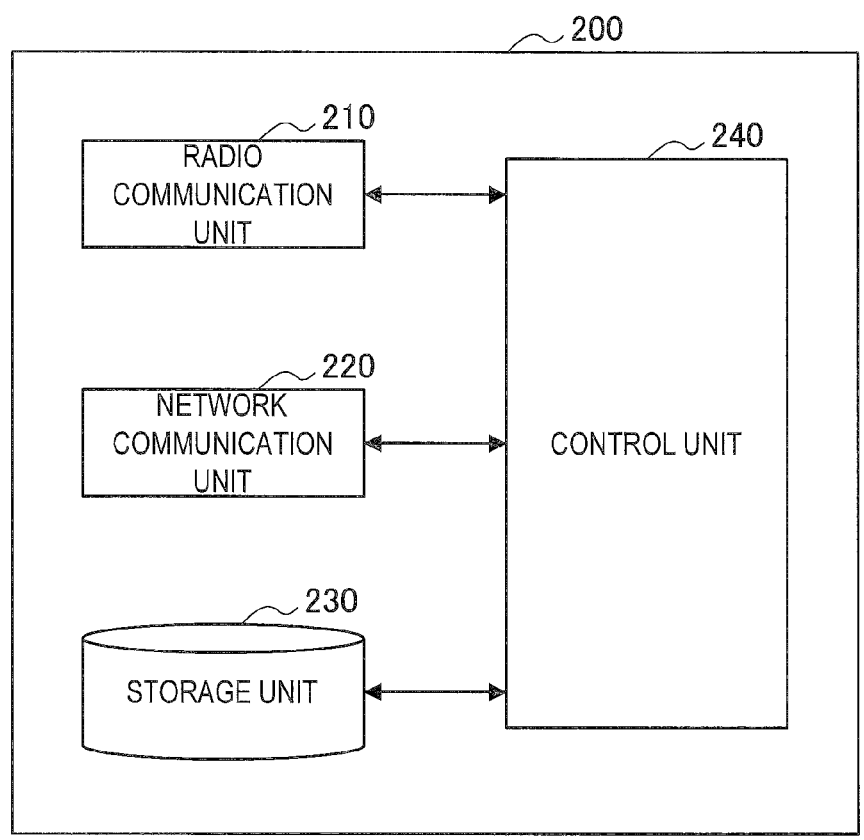
FIG. 10 is a block diagram illustrating an example of a configuration of an eNodeB according to an embodiment.
Figure 11:
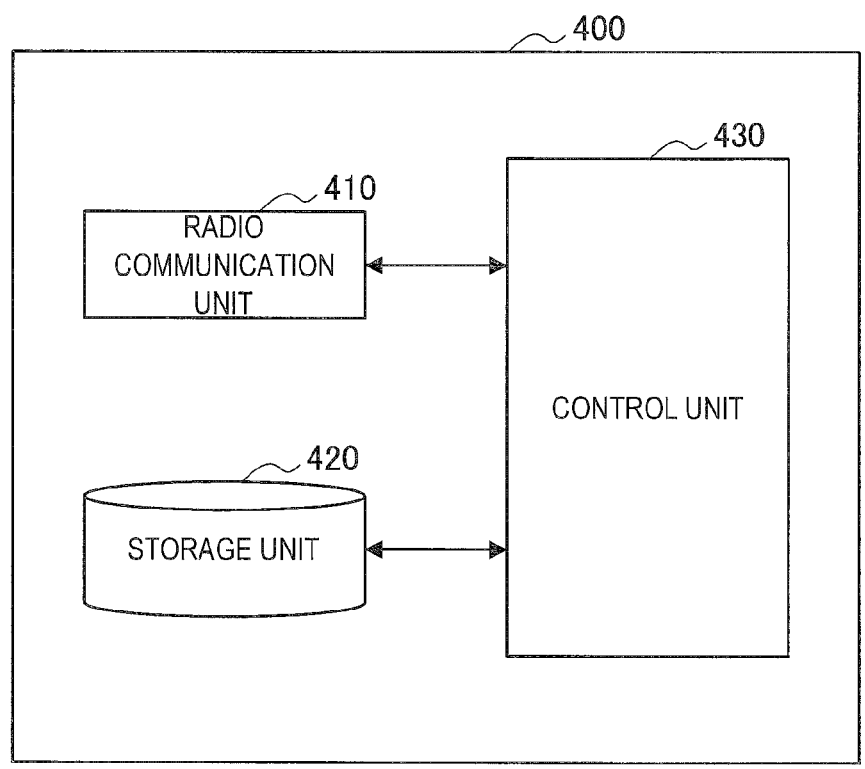
FIG. 11 is a block diagram illustrating an example of a configuration of a UE according to an embodiment.

Configurations of the determination entity 100, the eNodeB 200, and the UE 400 will be described with reference to FIGS. 9 to 11. For example, the eNodeB 300 of the operator B has the same configuration as the eNodeB 200, and the UE 500 of the operator B has the same configuration of the UE 400.

<3.1. Configuration of Determination Entity>

An example of the configuration of the determination entity 100 according to the present embodiment will be described with reference to FIG. 9. FIG. 9 is a block diagram illustrating the example of the configuration of the determination entity 100 according to the present embodiment. FIG. 9 shows that the determination entity 100 includes a network communication unit 110, a storage unit 120, and a control unit 130.

(Network Communication Unit 110)

The network communication unit 110 communicates with communication nodes in radio communication systems of operators. For example, the network communication unit 110 communicates with the MME 45 of the operator A and the MME 55 of the operator B directly or via any of the communication nodes. Meanwhile, the network communication unit 110, for example, communicates with the one or more eNodeBs 200 and the one or more eNodeBs 300 directly or via any of the communication nodes.

(Storage Unit 120)

The storage unit 120 stores a program and data for the operation of the determination entity 100. The storage unit 120 includes, for example, a storage medium such as a hard disk and a semiconductor memory.

(Control Unit 130)

The control unit 130 provides a variety of functions of the determination entity 100. For example, the control unit 130 corresponds to a processor such as a Central Processing Unit (CPU) and a Digital Signal Processor (DSP), and executes a program stored in the storage unit 120 or another storage medium to provide the variety of functions. The control unit 130 includes a resource determination section 131, a resource determination information acquiring section 133, a lease determination section 135, and a base station controlling section 137.

(Resource Determination Section 131)

The resource determination section 131 determines, on the basis of the use status of a frequency band owned by a first operator that provides a radio communication service, whether another operator can use the frequency band. In other words, the resource determination section 131 determines whether the frequency band owned by the first operator may be leased.

For example, the determination is made for each cell of the first operator. That is, the resource determination section 131 determines whether another operator can use the frequency band of each cell on the basis of the use status of the frequency band of each cell. Additionally, the frequency band includes, for example, one or more component carriers (CCs). The resource determination section 131 then determines, on the basis of the use status of each of the one or more CCs owned by the first operator, whether another operator can use each of the one or more CCs.

More specifically, if the first operator is, for example, the operator A, it is determined, on the basis of the use status of each CC (CC 1, CC 2, and CC 3) in each cell 20 of the operator A, whether each CC (CC 1, CC 2, and CC 3) in each cell 20 can be leased. As a result, it is determined that CCs 3 alone can be leased in a cell 20-1 and a cell 20-2 of the operator A, and a CC 2 and a CC 3 can be leased in a cell 20-3. That is, the determination result is shown in the following Table 1 (OK means that lease is possible, while— means that lease is impossible).

TABLE 1

| CC | Cell | | |
|---|---|---|---|
| | Cell 20-1 | Cell 20-2 | Cell 20-3 |
| CC1 | — | — | — |
| CC2 | — | — | OK |
| CC3 | OK | OK | OK |

For example, the resource determination section 131 determines, on the basis of the use status of another frequency band owned by a second operator, whether the second operator needs to use a further frequency band. In other words, the resource determination section 131 determines whether the second operator needs to lease a frequency band from another operator.

For example, the determination is made for each cell of the second operator. That is, the resource determination section 131 determines, on the basis of the use status of another frequency band owned by the second operator in each cell, whether the second operator needs to use a further frequency band in each cell.

More specifically, if the second operator is, for example, the operator B, it is determined, on the basis of the use status of each CC (CC 4, CC 5, and CC 6) in each cell 30 of the operator B, whether lease is needed in each cell 30. As a result, it is determined that a CC needs to be leased in a cell 30-1 of the operator B, and CCs do not need to be leased in a cell 30-2 and a cell 30-3. That is, the determination result is shown in the following Table 2 (Needed means that lease is needed, while—means that lease is not needed).

TABLE 2

| Operator | Cell | | |
|---|---|---|---|
| | Cell 30-1 | Cell 30-2 | Cell 20-3 |
| Operator B | Needed | — | — |

For example, the use status of the frequency band is a measured value or an actual value of at least one value of the number of UEs connected to the frequency band, the number of UEs trying to connect to the frequency band, a use ratio of a communication resource in the frequency band and a traffic volume in the frequency band, or a value derived from the measured value or the actual value. The number of UEs connected to the frequency band is, for example, the number of UEs in a Radio Resource Control (RRC) Connected state. The number of UEs trying to connect to the frequency band is, for example, the number of UEs that are in an RRC Idle state and access an eNodeB in a RACH (that is, UEs trying to come into the RRC Connected state).

As an example, the use status of each CC represents the sum of the number of UEs in the RRC Connected state and the number of UEs trying to come into the RRC Connected state in the CC. If, for example, the sum in the CC 3 in the cell 20-1 of the operator A exceeds a threshold in this case, it is determined that the CC 3 in the cell 20-1 cannot be leased. If not, it is determined that the CC 3 in the cell 20-1 can be leased. As another example, the use status of each CC may represent a traffic volume in the CC. If, for example, a traffic volume in the CC 3 in the cell 20-1 exceeds a threshold in this case, it is determined that the CC 3 in the cell 20-1 cannot be leased. If not, it is determined that the CC 1 in the cell 20-1 can be leased.

For example, the use status of the frequency band may also indicate whether new access of UEs is barred in the frequency band. Whether new access is barred, for example, indicates whether access barring in system information is activated. As an example, if access barring is activated in two or more of the CC 4, the CC 5, and the CC 6 in the cell 30-1, it is determined that a CC needs to be leased in the cell 30-1 of the operator B. If not, it is determined that a CC does not need to be leased in the cell 30-1.

(Resource Determination Information Acquiring Section 133)

The resource determination information acquiring section 133 acquires determination information indicating a result of a determination made by the resource determination section 131. First, the resource determination information acquiring section 133 acquires determination information (which will be referred to as "usability determination information" below) indicating a result obtained by determining, on the basis of the use status of a frequency band owned by a first operator, whether another operator can use the frequency band, the first operator providing a radio communication service. In other words, the resource determination information acquiring section 133 acquires the usability determination information indicating whether the frequency band owned by the first operator may be leased.

For example, the determination is made for each cell of the first operator. That is, the resource determination information acquiring section 133 acquires usability determination information indicating a result obtained by determining, on the basis of the use status of the frequency band of each cell, whether another operator can use the frequency band of each cell. For example, the frequency band includes one or more component carriers (CCs). The resource determination information acquiring section 133 acquires determination information on each CC indicating a result obtained by determining, on the basis of the use status of each of the one or more CCs owned by the first operator, whether another operator can use each of the one or more CCs.

More specifically, like the usability determination result in Table 1, for example, usability determination information (such as "OK" or "–" as discussed above) is acquired for each CC in each cell 20 of the operator A.

Second, the resource determination information acquiring section 133, for example, acquires further determination information (which will be referred to as "necessity determination information" below) indicating a result obtained by determining, on the basis of the use status of another frequency band owned by the second operator, whether the second operator needs to use a further frequency band. In other words, the resource determination information acquiring section 133 acquires necessity determination information indicating whether the second operator needs to lease a frequency band from another operator.

For example, the determination is also made for each cell of the second operator. That is, the resource determination information acquiring section 133 acquires necessity determination information on each cell indicating a result obtained by determining, on the basis of the use status of another frequency band owned by the second operator in each cell, whether the second operator needs to use a further frequency band in each cell.

More specifically, like the necessity determination result in Table 2, for example, necessity determination information (such as "Needed" or "–" as discussed above) is acquired for each cell 20 of the operator A.

(Lease Determination Section 135)

The lease determination section 135 determines whether the second operator is allowed to use the frequency band owned by the first operator on the basis of the acquired usability determination information. In other words, the lease determination section 135 determines whether to lease the frequency band owned by the first operator to the second operator, on the basis of whether the frequency band owned by the first operator may be leased.

For example, the lease determination section 135 determines whether the second operator is allowed to use the frequency band of each cell on the basis of the usability determination information on each cell. For example, the lease determination section 135 uses the acquired usability determination information on each CC to determine which of one or more CCs the second operator is allowed to use.

More specifically, like the usability determination result in Table 1, for example, usability determination information is acquired for each CC in each cell 20 of the operator A. In this case, the lease determination section 135 determines that the CCs 3 are leased in the cell 20-1 and the cell 20-2, and at least one of the CC 2 and the CC 3 is leased in the cell 20-3.

According to this determination, when a frequency band of the first operator can be used by another operator, it is determined that the frequency band is leased to the second operator. For example, the second operator can thus know which frequency can be used at what timing in which region. That is, the second operator can know whether the frequency band of the first operator can be used. A usability determination for each cell allows a frequency band to be leased in an area needed in units of cells. Accordingly, a frequency resource can be used more effectively from the viewpoint of areas. A usability determination for each CC allows a frequency band having a bandwidth needed in units of CCs to be leased. Accordingly, a frequency resource can be used more effectively from the viewpoint of frequencies.

For example, the lease determination section 135 determines whether the second operator is allowed to use a frequency band of the first operator on the basis of usability determination information and necessity determination information. In other words, the lease determination section 135 determines whether the second operator is allowed to use a frequency band owned by the first operator, on the basis of whether the frequency band of the first operator may be leased, and whether the second operator needs to lease a frequency band from another operator.

For example, the lease determination section 135 uses necessity information to confirm in which of the cells 30 (of the second operator) a frequency band needs to be leased from another operator. Next, the lease determination section 135 identifies the cells 20 (of the first operator) positioned in the neighborhood of the cell 30. The lease determination section 135 then uses the usability determination information to confirm in which of the identified cells 20 a frequency band may be leased to another operator. If a frequency band may be leased in the cell 20, the lease determination section 135 determines that the frequency band of the cell 20 is leased to the operator B.

More specifically, the necessity determination information on each cell 30 of the operator B like the necessity determination result in Table 2, for example, and the usability determination information on each cell 20 of the operator A like the usability determination result in the Table 1 are acquired. The lease determination section 135 uses the necessity information to confirm that a frequency band needs to be leased from the operator A in the cell 30-1. Next, the lease determination section 135 identifies the cell 20-1, the cell 20-2, and the cell 20-3 of the first operator, which are positioned in the neighborhood of the cell 30-1 as illustrated in FIG. 1. The lease determination section 135 uses the usability determination information to confirm that the CCs 3 alone may be leased in the cell 20-1 and the cell 20-2, and that the CC 2 and the CC 3 may be leased in the cell 20-3. The lease determination section 135 then determines that one or more of the CC 3 in the cell 20-1, the CC 3 in the cell 20-2, the CC 3 in the cell 20-3, and the CC 2 in the cell 20-3 are leased to the operator B for the sake of the cell 30-1 of the operator B.

As an example, the determination entity 100 stores a neighborhood relationship between cells of different operators (indicating, for example, which of the cells 20 of the operator A is positioned in the neighborhood of which of the cells 30 of the operator B) in advance. Alternatively, positional information on an eNodeB of each operator is acquired at any time, and the neighborhood relationship may be identified at any time on the basis of the positional information.

It also depends on a technique of leasing a frequency band in the specific example how a CC that is leased to the operator B is selected from the CC 3 in the cell 20-1, the CC 3 in the cell 20-2, the CC 3 in the cell 20-3, and the CC 2 in the cell 20-3.

For example, when the second leasing technique (a frequency band is operated by an eNodeB of a lessor operator) is used, there is no restriction in particular on the selection of CCs. For example, a number of CCs according to the communication capacity further needed in the cell 30-1 may be selected at random. Alternatively, a number of CCs according to the communication capacity further needed in the cell 30-1 may be selected from CCs in the cells 20 closer to the cell 30-1 in order. That is, CCs may be selected from the CC 3 in the cell 20-1, the CC 3 in the cell 20-3, the CC 2 in the cell 20-3, and the CC 3 in the cell 20-2 in order.

For example, when the first leasing technique (a frequency band is operated by an eNodeB of a lessee operator) is used, it is desirable to select a CC such that interference between the cell 20 using a leased frequency band and the cell 30 using the same frequency band in the neighborhood becomes weaker. For example, the same CCs in the one or more cells 20 partially or entirely overlapping with the cell 30-1 may be selected. That is, the CCs 3 in the cell 20-1, the cell 20-2, and the cell 20-3 may be selected. This selection can reduce the interference even if the first leasing technique is used as a technique of leasing a frequency band.

This lease determination allows a frequency band of the first operator to be used by another operator. In addition, when the frequency band is needed by the second operator, it is determined that the frequency band is leased to the second operator. The second operator can thus lease the frequency band only when a frequency band is needed. That is, a frequency band is minimally leased, so that exchange of information between operators for the lease of a frequency band can be minimal. It is also possible to avoid the situation in which a lot of frequency bands are leased, so that operators that own the frequency bands lack a frequency band.

(Base Station Controlling Section 137)

When it is determined that the second operator is allowed to use the frequency band of the first cell of the first operator, the base station controlling section 137 causes an eNodeB for the first cell to stop a UE in the first cell of the first operator from using the frequency band. More specifically, when it is determined that the CC 3 in the cell 20-1 of the operator A is leased to the operator B, the base station controlling section 137, for example, causes an eNodeB 200-1 for the cell 20-1 to stop the UE 400 in the cell 20-1 from using the CC 3. As an example, the base station controlling section 137 transmits an instruction of processing for stopping the use of the leased CC 3 to the eNodeB 200-1, which leases the CC 3, via the network communication unit 110, thereby stopping the UE 400 in the cell 20-1 from using the CC 3.

Stopping the use in this way allows a frequency band leased from the first operator to be leased to the second operator in a state in which the frequency band is not used by a UE of the first operator (that is, released state). As a result, the second operator can actually use the leased frequency band. For example, if several UEs 400 use CCs leased from the operator A, it is possible to lease the CCs to the operator B in a state in which the CCs are not used by the several UEs 400 (and another new UE 400). As a result, UEs (e.g. 100 UEs) of the operator B can actually use the leased CCs.

Stopping the use of a frequency band as discussed above needs to be dynamically performed in response to the lease of a frequency band. Specific techniques of stopping the use of a frequency band in this way (which will be referred to as stopping techniques) will be described below. Additionally, a specific example for each technique assumes that it is determined that the CC 3 in the cell 20-1 of the operator A is leased to the operator 3 as discussed above.

As a first stopping technique, the base station controlling section 137, for example, causes an eNodeB for the first cell to notify a UE of the first operator that new access is barred in the frequency band. More specifically, the base station controlling section 137, for example, causes the eNodeB 200-1 to notify the UE 400 that new access is barred in the CC 3. The eNodeB 200-1, for example, activates access barring in system information on the CC 3, thereby notifying the UE 400 that new access is barred in the CC 3. This notification can prevent a UE of the operator that has leased a frequency band from newly using the leased frequency band. For example, when a radio communication system of the first operator is a radio communication system of LTE-A, it is possible to prevent a UE from newly establishing a connection in a leased CC, and prevent the CC from being newly used as the PCC.

Next, a second stopping technique and a third stopping technique will be described. As a premise, a UE of the first operator is capable of radio communication by using one primary frequency band and one or more secondary frequency bands. A frequency band owned by the first operator is used as the primary frequency band or the secondary frequency bands. For example, if the first operator is the operator A and a radio communication system of the operator A is a radio communication system of LTE-A, the UE 400 can wirelessly communicate by using one PCC and one or more SCCs. The CC 1, the CC 2, and the CC 3 are used as the PCC or SCCs.

As the second stopping technique, the base station controlling section 137, for example, causes an eNodeB for the first cell to perform handover of a UE of the first operator using the frequency band as a primary frequency band to another frequency band. More specifically, the base station controlling section 137, for example, causes the eNodeB 200-1 to perform the handover of the UE 400 using the CC 3 as the PCC to another CC (such as the CC 1 and the CC 2). This handover excludes UEs using the leased frequency band as the primary frequency band. That is, the leased frequency is used as the secondary frequency band alone. For example, if a radio communication system of the first operator is a radio communication system of LTE-A, it is possible to exclude UEs using the leased CC as the PCC. That is, the leased CC is used as the SCC alone.

As the third stopping technique, the base station controlling section 137, for example, stops an eNodeB for the first cell from allocating a communication resource to a UE of the first operator using the frequency band as a secondary frequency band. More specifically, the base station controlling section 137, for example, stops the eNodeB 200-1 from allocating a communication resource to the UE 400 using the CC 3 as the SCC. Stopping the allocation of a communication resource in this way can exclude UEs using the leased frequency band as a secondary frequency band. For example, if a radio communication system of the first operator is a radio communication system of LTE-A, and when a communication resource is not allocated for a predetermined time, SCCs are deactivated. Accordingly, it is possible to exclude UEs using the leased CC as the SCC.

As a fourth stopping technique, the base station controlling section 137, for example, causes an eNodeB for the first cell to update the linkage between the frequency band and another frequency band having a link direction different from a link direction of the frequency band. More specifically, the base station controlling section 137, for example, causes the eNodeB 200-1 to update the linkage between the CC 3 and another CC (CC 1 or CC 2) having a link direction different from a link direction of the CC 3. The eNodeB 200-1, for example, updates linkage information on a SIB 2. Updating the linkage in this way can separate the frequency band leased from the first operator from another frequency band owned by the first operator.

Once the use of the leased frequency band is completely stopped, the eNodeB 200 notifies the base station controlling section 137 that the use is completely stopped. Thereafter, preparations are made for the use of the frequency band by the second operator that has leased the frequency band.

Even after the lease of a frequency band owned by the first operator to the second operator is finished, the base station controlling section 137 may cause an eNodeB using the frequency band to stop the use of the frequency band by a UE of the second operator.

<3.2. Configuration of eNodeB>

Next, an example of a configuration of the eNodeB 200 according to the present embodiment will be described with reference to FIG. 10. FIG. 10 is a block diagram illustrating the example of the configuration of the eNodeB 200 according to the present embodiment. FIG. 10 shows that the eNodeB 200 includes a radio communication unit 210, a network communication unit 220, a storage unit 230, and a control unit 240.

(Radio Communication Unit 210)

The radio communication unit 210 uses a frequency band to wirelessly communicate with a UE in a cell. More specifically, the radio communication unit 210, for example, uses the frequency band 25 (CC 1, CC 2, or CC 3) owned by the operator A to wirelessly communicate with the UE 400 of the operator A in the cell 20 of the eNodeB 200.

For example, the first leasing technique (a frequency band is operated by an eNodeB of a lessee operator) may be used. In this case, once the frequency band 35 of the operator B is leased to the operator A, the radio communication unit 210 uses the frequency band 35 (CC 4, CC 5, or CC 6) owned by the operator B to wirelessly communicate with the UE 400 of the operator A in the cell 20 of the eNodeB 200.

For example, the second leasing technique (a frequency band is operated by an eNodeB of a lessor operator) may be used. In this case, once the frequency band 25 of the operator A is leased to the operator B, the radio communication unit 210 uses the frequency band 25 (CC 1, CC 2, or CC 3) owned by the operator A to wirelessly communicates with the UE 500 of the operator B in the cell 20 of the eNodeB 200.

Additionally, the radio communication unit 210 includes, for example, an antenna and an RF circuit.

(Network Communication Unit 220)

The network communication unit 220 communicates with another communication node. For example, the network communication unit 220 communicates with the S-GW 41, the P-GW 43, and the MME 45 directly or via communication nodes. For example, the network communication unit 220 communicates with the determination entity 100 directly or via communication nodes.

(Storage Unit 230)

The storage unit 230 stores a program and data for the operation of the eNodeB 200. The storage unit 230 includes, for example, a storage medium such as a hard disk and a semiconductor memory.

(Control Unit 240)

The control unit 240 provides a variety of functions of the eNodeB 200. For example, the control unit 240 corresponds to a processor such as a CPU and a DSP, and executes a program stored in the storage unit 230 or another storage medium to provide the variety of functions.

When it is determined that the operator B is allowed to use the frequency band 25 of the cell 20 of the eNodeB 200, the control unit 240 stops the use of the frequency band 25 by the UE 400 of the operator A in the cell of the eNodeB 200 in accordance with the control of the determination entity 100. Additionally, the use of a frequency band is stopped, for example, by the first to fourth stopping techniques.

When a frequency band is leased, the eNodeB 200 uses the leased frequency band, and then the lease of the frequency band is finished, the base station controlling section 240 stops the use of the frequency band by a UE of the lessee operator that has leased the frequency band.

<3.3. Configuration of UE>

Next, an example of a configuration of the UE 400 according to the present embodiment will be described with reference to FIG. 11. FIG. 11 is a block diagram illustrating the example of the configuration of the UE 400 according to the present embodiment. FIG. 11 shows that the UE 400 includes a radio communication unit 410, a storage unit 420, and a control unit 430.

(Radio Communication Unit 410)

The radio communication unit 410 uses a frequency band to wirelessly communicate with an eNodeB. More specifically, the radio communication unit 410, for example, uses the frequency band 25 (CC 1, CC 2, or CC 3) owned by an operator A in the cell 20 of the operator A to wirelessly communicate with the eNodeB 200 for the cell 20.

For example, the first leasing technique (a frequency band is operated by an eNodeB of a lessee operator) may be used. In this case, once the frequency band 35 of the operator B is leased to the operator A, the radio communication unit 410 uses the frequency band 35 (CC 4, CC 5, or CC 6) owned by the operator B in the cell 20 of the eNodeB 200 of the operator A to wirelessly communicate with the eNodeB 200 of the operator A.

For example, the second leasing technique (a frequency band is operated by an eNodeB of a lessor operator) may be used. In this case, once the frequency band 35 of the operator B is leased to the operator A, the radio communication unit 410 uses the frequency band 35 (CC 4, CC 5, or CC 6) owned by the operator B in the cell 30 of the eNodeB 300 of the operator B to wirelessly communicate with the eNodeB 300 of the operator B.

Additionally, the radio communication unit 410 includes, for example, an antenna and an RF circuit.

(Storage Unit 420)

The storage unit 420 stores a program and data for the operation of the UE 400. The storage unit 420 includes, for example, a storage medium such as a hard disk and a semiconductor memory.

(Control Unit 430)

The control unit 430 provides a variety of functions of the UE 400. For example, the control unit 430 corresponds to a processor such as a CPU and a DSP, and executes a program stored in the storage unit 420 or another storage medium to provide the variety of functions.

When it is determined that the operator B is allowed to use the frequency band 25 in the cell 20 of the eNodeB 200, the control unit 430 stops the use of the frequency band 25 in the cell of the eNodeB 200 in accordance with the control of the eNodeB 200.

When a frequency band is leased, the UE 400 uses the leased frequency band, and then the lease of the frequency band is finished, the control unit 430 stops the use of the frequency band.

4. Procedure of Processing

Figure 12:
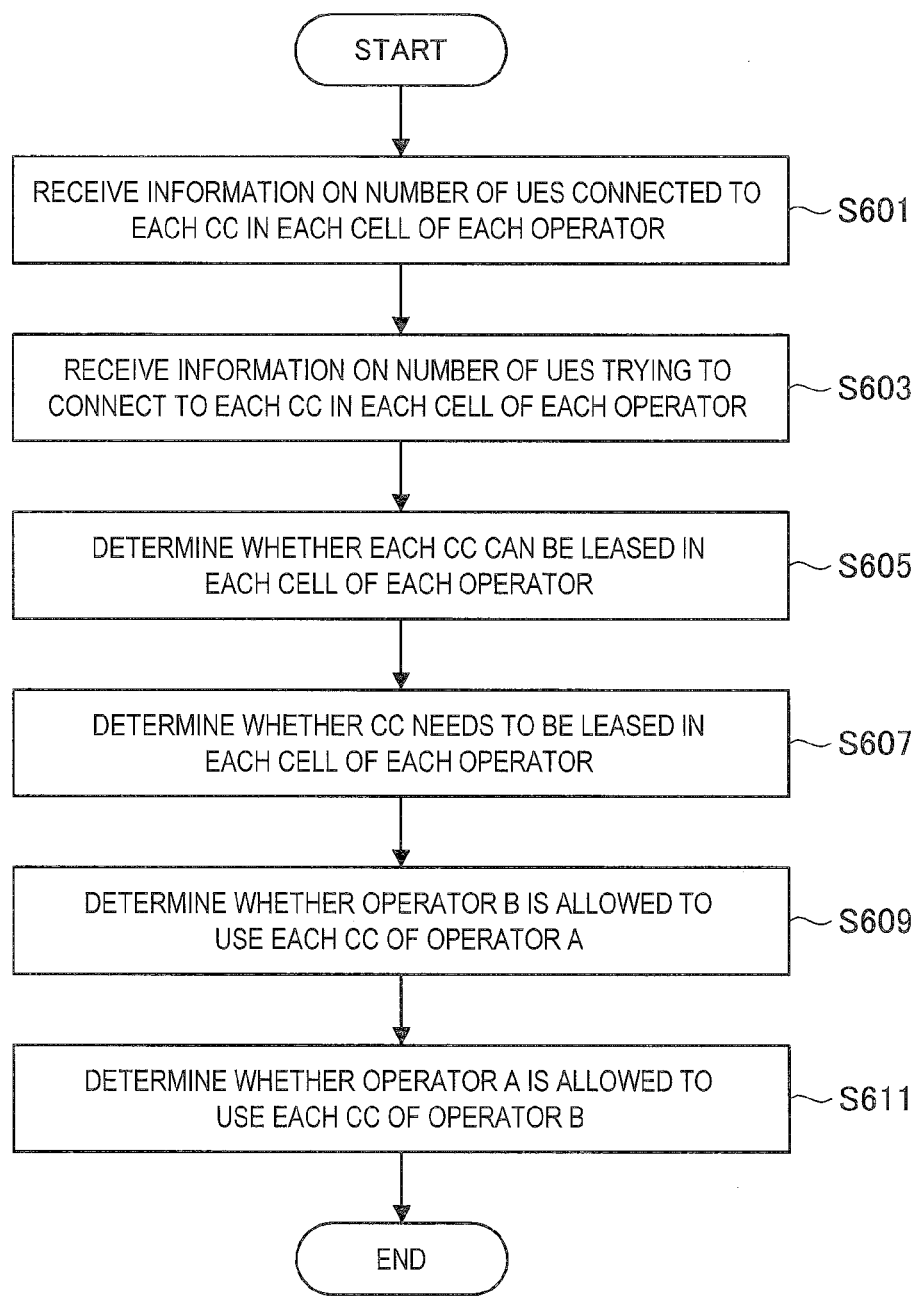
FIG. 12 is a flowchart illustrating an example of a schematic procedure of determination processing by a determination entity according to an embodiment.

Next, an example of processing according to the present embodiment will be described with reference to FIGS. 12 to 14.

<4.1. Determination Processing>

First of all, an example of determination processing by the determination entity 100 according to the present embodiment will be described with reference to FIG. 12. FIG. 12 is a flowchart illustrating an example of a schematic procedure of the determination processing by the determination entity 100 according to the present embodiment.

First of all, the resource determination section 131 receives, in step S601, information on the number of UEs connected to each component carrier (CC) in each cell of each operator (operator A and operator B) via the network communication unit 110. The resource determination section 131 also receives, in step S603, information on the number of UEs trying to connect to each CC in each cell of each operator via the network communication unit 110.

Next, the resource determination section 131 determines, in step S605, whether each CC can be leased in each cell of each operator on the basis of the information on the number of connected UEs and the information on the number of UEs trying connections. The resource determination section 131 also determines, in step S607, whether a CC needs to be leased in each cell of each operator on the basis of the information on the number of connected UEs and the information on the number of UEs trying connections. That is, the resource determination section 131 generates usability determination information and necessity determination information.

The lease determination section 135 then determines, in step S609, whether the operator B is allowed to use each CC of the operator A on the basis of the usability determination information of the operator A and the necessity determination information of the operator B. The lease determination section 135 also determines, in step S611, whether the operator B is allowed to use each CC of the operator A on the basis of the usability determination information of the operator B and the necessity determination information of the operator A. The processing is then finished.

<4.2. Processing of Stopping Use>

Next, an example of processing of stopping the use of a frequency band by the determination entity 100 and a base station 200 according to the present embodiment will be described with reference to FIGS. 13 and 14. Let us assume in the example that it is determined that a CC owned by the operator A is leased to the operator B.

(Processing by Determination Entity 100)

Figure 13:
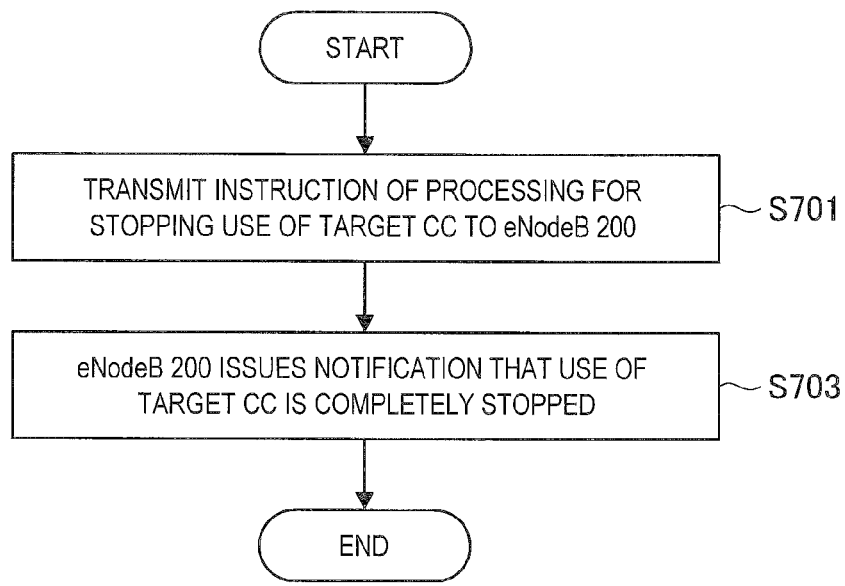
FIG. 13 is a flowchart illustrating an example of a schematic procedure of processing by a determination entity according to an embodiment for stopping use of a frequency band.

FIG. 13 is a flowchart illustrating an example of a schematic procedure of processing of stopping the use of a frequency band by the determination entity 100 according to the present embodiment.

First of all, the base station controlling section 137 transmits, in step S701, an instruction of processing for stopping the use of the leased CC (which will be referred to as "target CC" below) to the eNodeB 200, which has leased the CC, via the network communication unit 110.

Next, the base station controlling section 137 is, in step S703, notified by the eNodeB 200 that the use is completely stopped. The processing is then finished. Thereafter, preparations are made for the operator B to use the leased CC.

(Processing by eNodeB 200)

Figure 14:
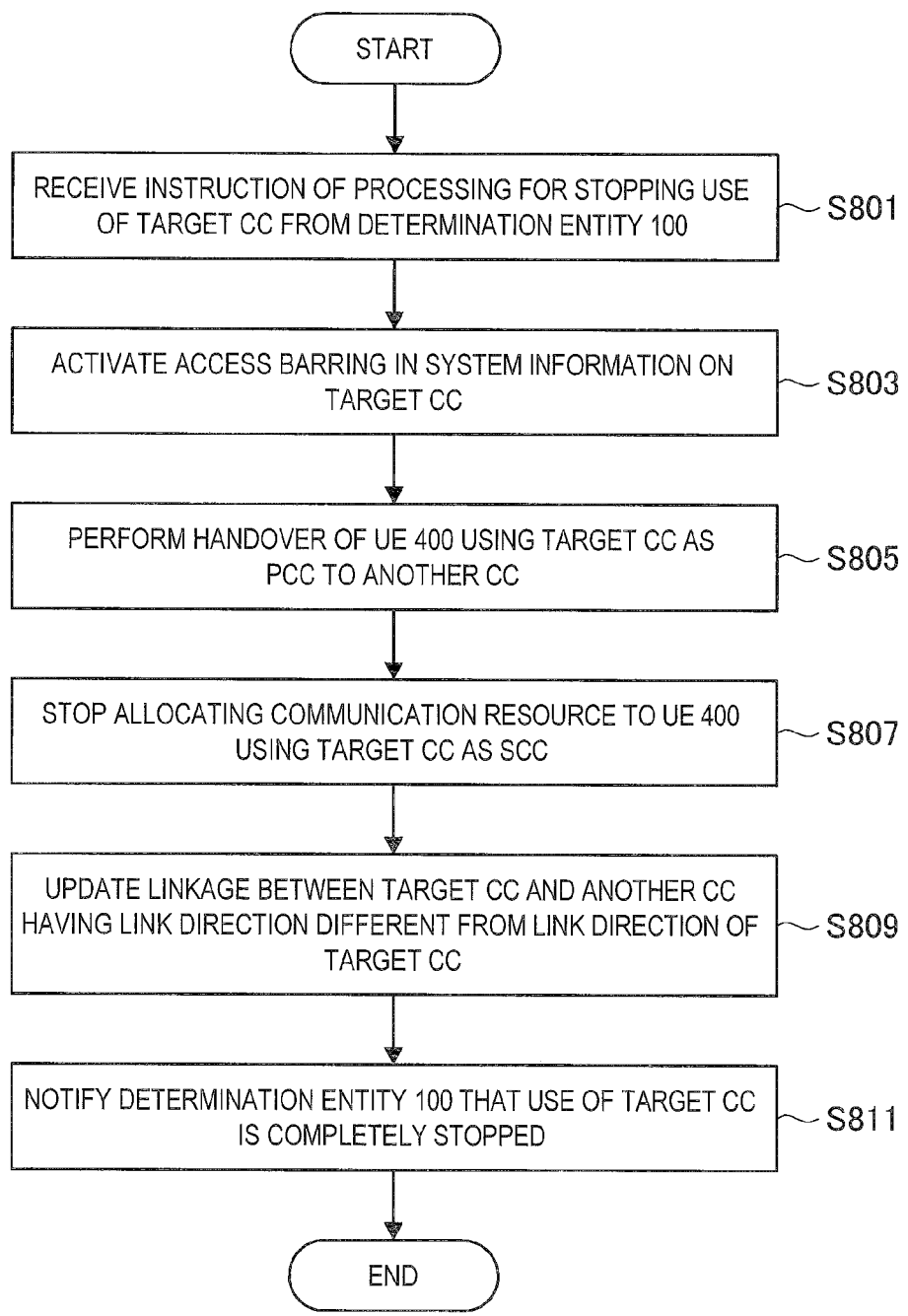
FIG. 14 is a flowchart illustrating an example of a schematic procedure of processing by an eNodeB according to an embodiment for stopping use of a frequency band.

FIG. 14 is a flowchart illustrating an example of a schematic procedure of processing of stopping the use of a frequency band by the eNodeB 200 according to the present embodiment.

First of all, the control unit 240 receives, in step S801, the instruction of processing for stopping the use of the target CC from the determination entity 100 via the network communication unit 220.

Next, the control unit 240 activates, in step S803, access barring in system information on the target CC.

The control unit 240 performs, in step S805, handover of the UE 400 using the target CC as the PCC to another CC.

The control unit 240, in step S807, stops allocating a communication resource to the UE 400 using the target CC as the SCC.

The control unit 240 updates, in step S809, the linkage between the target CC and another CC having a link direction different from a link direction of the target CC.

The determination entity 100 is, in step S811, notified that the use of the target CC is completely stopped. The processing is then finished.

5. Modified Example

Next, a modified example of the present embodiment will be described with reference to FIGS. 15 to 17. According to the modified example, even when the first leasing technique (a frequency band is operated by an eNodeB of a lessee operator) is used as a technique of leasing a frequency band, interference between cells of different operators is reduced, the interference being caused by lease of a frequency band.

(Interference Caused by Lease of Frequency Band)

For example, when the first leasing technique (a frequency band is operated by an eNodeB of a lessee operator) is used, and a frequency band of the first operator is leased to the second operator, interference may occur between a cell of the first operator and a cell of the second operator. This point will be described more specifically below with reference to FIGS. 15 and 16.

Figure 15:
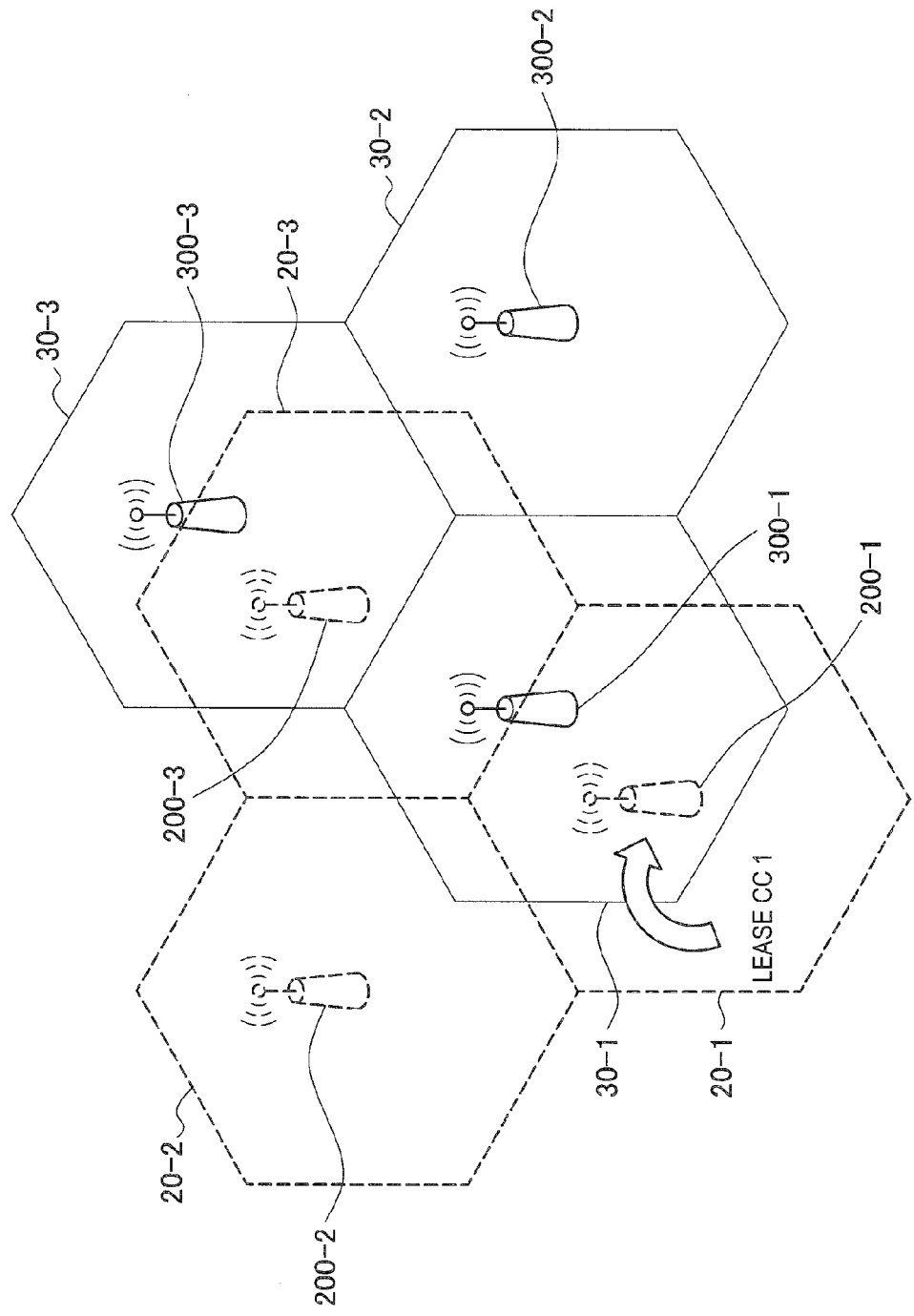
FIG. 15 is an explanatory diagram for describing an example of lease of a frequency band between operators.

FIG. 15 is an explanatory diagram for describing an example of the lease of a frequency band between operators. FIG. 15 illustrates and FIG. 15 illustrates the cells 20 of the operator A and the cells 30 of the operator B as illustrated in FIG. 1. For example, the CC 1 in the cell 20-1 is leased to the cell 30-1 of the operator B in this example. In this case, the eNodeB 300-1 for the cell 30-1 of the operator B operates the CC 1, and uses the CC 1 to communicate with the UE 500 of the operator B in the cell 30-1.

Meanwhile, the CC 1 is not leased to the operator B in the cell 20-2, so that the eNodeB 200-2 for the cell 20-2 of the operator A also uses the CC 1 to communicate with the UE 400 of the operator A in the cell 20-2. Since the CC 1 is not leased to the operator B in the cell 20-3, the eNodeB 200-3 for the cell 20-3 of the operator A also uses the CC 1 to communicate with the UE 400 of the operator A in the cell 20-3.

Figure 16:
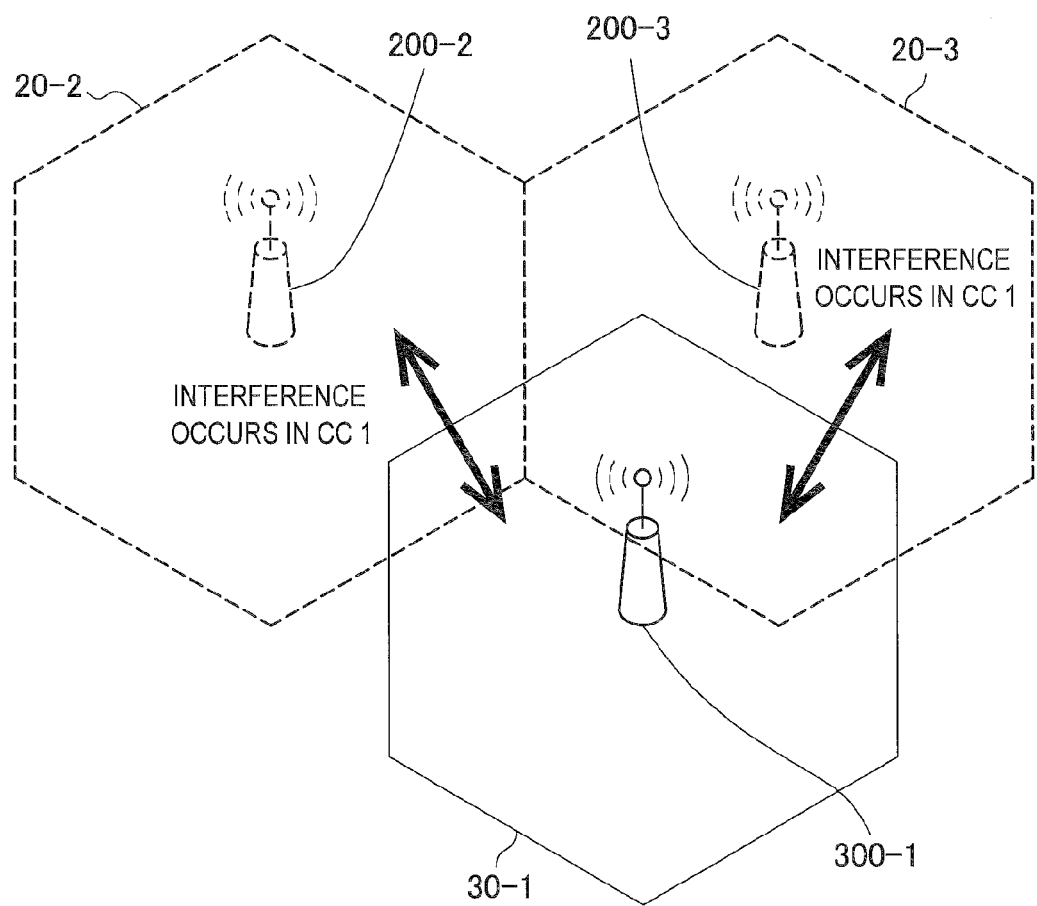
FIG. 16 is an explanatory diagram for describing an example of interference between cells of different operators, the interference caused by lease of a frequency band.

FIG. 16 is an explanatory diagram for describing an example of interference between cells of different operators, the interference being caused by lease of a frequency band. Once a frequency band is leased as illustrated in FIG. 15, interference may occur in the CC 1 between the cell 20-2 and the cell 30-1, which overlap with each other in part, as illustrated in FIG. 16. In the same way, interference may occur in the CC 1 between the cell 20-3 and the cell 30-1, which overlap with each other in part.

(Inter-Cell Interference Coordination)

Inter-Cell Interference Coordination (ICIC) in the release 8 version of the 3GPP specifications will be here described.

Information on transmission power for a downlink is shared between adjacent cells for each resource block (12 subcarriers×7 OFDM symbols) in the ICIC in the release 8 version. The information is referred to as Relative Narrow-band Transmit Power (RNTP) Indicator. eNodeBs for adjacent cells can predict a level of interference in each resource block upon receiving the RNTP. The specifications do not standardize processing executed by eNodeBs after predicting the level of interference. The processing depends on the implementation.

Two types of signals including an Overload Indicator (OI) and a High Interference Indicator (HII) for an uplink are supposed to be transmitted and received between eNodeBs for adjacent cells via an X2 interface in the ICIC in the release 8 version. The OI indicates interference intensity and noise intensity for each uplink resource block in three levels. Meanwhile, the HII indicates whether to allocate a communication resource to a UE positioned at the end of a cell (i.e. peripheral part) in a frequency band in the near future. That is, the HII reports scheduling for the near future.

(Technical Problem)

The ICIC as discussed above is a technique of controlling interference in the same operator, which premises that cells of the same operator have the X2 interface therebetween. Accordingly, the ICIC cannot be applied to interference between cells of different operators without any modification as described with reference to FIG. 15, the interference being caused by lease of a frequency band.

Technique in Modified Example

Accordingly, the X2 interface is provided between different operators in a modified example of the present embodiment. Information is transmitted and received via the X2 interface for reducing interference in the leased frequency band.

That is, as a premise, when it is determined that a second operator is allowed to use a frequency band of a first cell of a first operator, the frequency band is used by an eNodeB for a second cell of the second operator overlapping with the first cell at least in part for the communication with a UE of the second operator. More specifically, when, for example, it is determined that the operator B is allowed to use the CC 1 of the cell 20-1 of the operator A as illustrated in FIG. 15, the CC 1 is used by the eNodeB 300-1 for the cell 30-1 overlapping with the cell 20-1 at least in part for the communication with a UE 500 of the operator B.

The eNodeB of the first operator and the eNodeB of the second operator transmit and receive information for reducing interference (which will be referred to as "interference reducing information" below) in the frequency band via an interface between a base station of the first operator and a base station of the second operator. More specifically, the eNodeB 200-2 and the eNodeB 200-3 of the operator A and the eNodeB 300-1 of the operator B, for example, transmit and receive interference reducing information on the CC 1 via the X2 interface. This point will be further described below with reference to FIG. 17.

Figure 17:
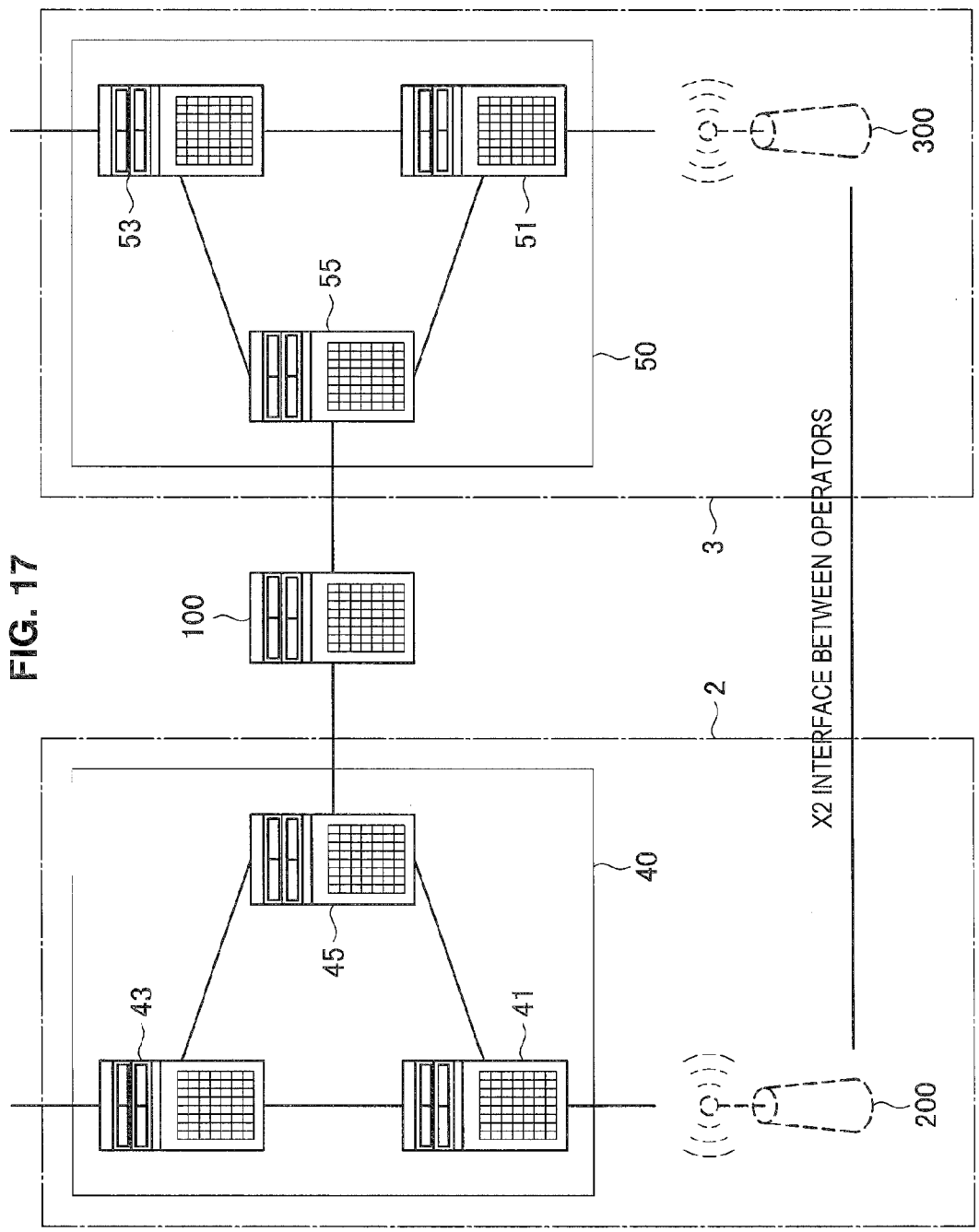
FIG. 17 is an explanatory diagram for describing an example of an X2 interface between different operators.

FIG. 17 is an explanatory diagram for describing an example of the X2 interface between different operators. FIG. 17 shows that the X2 interface is provided between the eNodeB 200 of the operator A and the eNodeB 300 of the operator B. The X2 interface is a logical interface. The eNodeB 200 and the eNodeB 300 then communicate with each other through the X2 interface directly or via a communication node.

Various kinds of information such as information on each resource block and scheduling information are transmitted and received through the X2 interface in the same operator. However, the amount of information transmitted and received through the X2 interface between different operators should be less than the amount of information transmitted and received through the X2 interface in the same operator in order to reduce the amount of information exchanged between the operators.

For example, the interference reducing information on a frequency band includes information indicating which of a plurality of partial bands included in the frequency band has a communication resource allocated to a UE positioned at the end of a cell. More specifically, each eNodeB (control unit of each eNodeB), for example, divides a CC 1 into a plurality of partial bands (e.g. three partial bands), and decides which of the plurality of partial bands has a communication resource allocated to a UE positioned at the end of a cell. Each eNodeB then transmits information indicating the decided partial band as interference control information via the X2 interface between different operators. For example, each eNodeB quasi-statically transmits the interference reducing information. Dividing a frequency band in this way is referred to as Partial Frequency Reuse.

More specifically, interference reducing information on a CC 1 which is transmitted by the eNodeB 300-1 indicates one of the three partial bands in the CC 1 which is used by the UE 500 positioned at the end of the cell 30-1. Meanwhile, interference reducing information on a CC 1 which is transmitted by the eNodeB 200-2 indicates one of the three partial bands in the CC 1 which is used by the UE 400 positioned at the end of the cell 20-2.

This information makes it possible to predict which frequency in a frequency band has more intense interference, also making it possible to reduce the interference. It is also possible to reduce information exchanged between different operators.

Alternative Technique in Modified Example

It is possible that the second leasing technique is used as an alternative technique in the modified example instead of the first leasing technique. That is, when it is determined that a second operator is allowed to use a frequency band of a first cell of a first operator, a base station for the first cell uses the frequency band for the communication with a UE of the second operator in the alternative technique. More specifically, when it is determined that the operator B is allowed to use a CC 1 of the cell 20-1 in the operator A, the eNodeB 200-1 for the cell 20-1 uses the CC 1 for the communication with the UE 500 of the operator B. That is, data transmitted and received by the UE 500 of the operator B in the CC 1 passes through the eNodeB 200-1 of the operator A.

In this way, the second leasing technique allows the X2 interface between cells of the same operator to reduce interference in a frequency band. That is, the ICIC can be used. Accordingly, it is possible to reduce interference caused by lease of a frequency band between different operators.

6. Conclusion

The embodiment of the present disclosure has been described so far with reference to FIGS. 1 to 17. According to the present embodiment, according to the present embodiment, usability determination information is acquired, the usability determination information indicating a result obtained by determining, on the basis of the use status of a frequency band owned by the first operator, which provides a radio communication service, whether another operator can use the frequency band. It is determined whether the second operator is allowed to use the frequency band on the basis of the acquired usability determination information.

According to this determination, when a frequency band of the first operator can be used by another operator, it is determined that the frequency band is leased to the second operator. For example, the second operator can thus know which frequency can be used at what timing in which region. That is, the second operator can know whether a frequency band of the first operator can be used.

For example, it is determined whether the second operator is allowed to use the frequency band of each cell on the basis of usability determination information on each cell.

This usability determination for each cell allows a frequency band to be leased in an area needed in units of cells. Accordingly, a frequency resource can be used more effectively from the viewpoint of areas.

For example, it is determined, on the basis of determination information on each component carrier (CC), which of one or more CCs the second operator is allowed to use.

This determination for each CC allows a frequency band having a bandwidth needed in units of CCs to be leased. Accordingly, a frequency resource can be used more effectively from the viewpoint of frequencies.

Further necessity determination information is acquired, the further necessity determination information indicating a result obtained by determining, on the basis of the use status of another frequency band owned by the second operator, whether the second operator needs to use a further frequency band. It is then determined whether the second operator is allowed to use the frequency band on the basis of the usability determination information and the necessity determination information.

This lease determination allows a frequency band of the first operator to be used by another operator. In addition, when the frequency band is needed by the second operator, it is determined that the frequency band is leased to the second operator. The second operator can thus lease the frequency band only when a frequency band is needed. That is, a frequency band is minimally leased, so that exchange of information between operators for the lease of a frequency band can be minimal. It is also possible to avoid the situation in which a lot of frequency bands are leased, so that operators that own the frequency bands lack a frequency band.

When it is determined that the second operator is allowed to use the frequency band of the first cell of the first operator, an eNodeB for the first cell stops the use of the frequency band by a UE of the first operator in the first cell.

Stopping the use in this way allows a frequency band leased from the first operator to be leased to the second operator in a state in which the frequency band is not used by a UE of the first operator (that is, released state). As a result, the second operator can actually use the leased frequency band. For example, if several UEs 400 use CCs leased from the operator A, it is possible to lease the CCs to the operator B in a state in which the CCs are not used by the several UEs 400 (and another new UE 400). As a result, UEs (e.g. 100 UEs) of the operator B can actually use the leased CCs.

For example, as the first stopping technique, a UE of the first operator is notified that new access is barred in the frequency band.

This notification can prevent a UE of an operator that has leased a frequency band from newly using the leased frequency band. For example, if a radio communication system of the first operator is a radio communication system of LTE-A, it is possible to prevent a UE from newly establishing a connection in a leased CC, and prevent the CC from being newly used as the PCC.

For example, as the second stopping technique, handover of a UE of the first operator using the frequency band as a primary frequency band to another frequency band is performed.

This handover can exclude a UE that uses a leased frequency band as a primary frequency band. That is, the leased frequency is used as a secondary frequency band alone. For example, if a radio communication system of the first operator is a radio communication system of LTE-A, it is possible to exclude a UE that uses a leased CC as the PCC. That is, the leased CC is used as the SCC alone.

For example, as the third stopping technique, the allocation of a communication resource to a UE of the first operator is stopped, the UE of the first operator using the frequency band as the secondary frequency band.

Stopping the allocation of a communication resource in this way can exclude UEs using the leased frequency band as a secondary frequency band. For example, if a radio communication system of the first operator is a radio communication system of LTE-A, and when a communication resource is not allocated for a predetermined time, SCCs are deactivated. Accordingly, it is possible to exclude UEs using the leased CC as the SCC.

For example, as the fourth stopping technique, the linkage between the frequency band and another frequency band is updated, the other frequency band having a link direction different from a link direction of the frequency band.

Updating linkage in this way can separate the frequency band leased from the first operator from another frequency band owned by the first operator.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the determination entity is positioned between radio communication systems of different operators in the embodiment. However, the present technology is not limited to the example. For example, the determination entity may be a new apparatus included in a radio communication system of an operator, or may be implemented as a new function of the existing apparatus (such as an MME, an S-GW, and an eNodeB) of a radio communication system of an operator.

It has been described that a radio communication system of an operator is a radio communication system of LTE-A. However, the radio communication system of the operator is not limited thereto. For example, the radio communication system of the operator may be similar to a radio communication system of LTE-A, or a radio communication system compliant with a standard more evolved than LTE-A.

A base station for a cell is an eNodeB of LTE-Advanced in the embodiment. However, the present technology is not limited to the example. For example, the base station may be compliant with another communication standard.

A terminal apparatus that communicates in a cell is a UE of LTE-Advanced in the embodiment. However, the present technology is not limited to the example. For example, the terminal apparatus may be compliant with another communication standard.

Processing steps in the various communication control processing in the present description do not necessarily have to be performed in the chronological order described in the flowcharts. For example, the processing steps in the various communication control processing may be performed in order different from the order described as the flowcharts, or may be performed in parallel.

It is possible to produce a computer program for causing hardware such as a CPU, ROM, and RAM built in a communication control apparatus, a base station, or a terminal apparatus to execute a function corresponding to each configuration of the communication control apparatus, the base station, or the terminal apparatus. There is also provided a storage medium having the computer program stored therein.

Additionally, the present technology of the present disclosure may also be configured as below.

(1)

A communication control apparatus including:

an acquisition unit configured to acquire determination information indicating a result obtained by determining, on the basis of a use status of a frequency band owned by a first operator that provides a radio communication service, whether it is possible for another operator to use the frequency band; and a determination unit configured to determine whether a second operator is allowed to use the frequency band on the basis of the acquired determination information.

(2)

The communication control apparatus according to (1), wherein the acquisition unit acquires determination information on each cell indicating a result obtained by determining, on the basis of the use status of the frequency band of each cell, whether it is possible for another operator to use the frequency band of each cell, and wherein the determination unit determines whether the second operator is allowed to use the frequency band of each cell on the basis of the determination information on each cell.

(3)

The communication control apparatus according to (2), further including:

a control unit configured to, when it is determined that the second operator is allowed to use the frequency band of a first cell of the first operator, cause a base station for the first cell to stop use of the frequency band by a terminal apparatus of the first operator in the first cell.

(4)

The communication control apparatus according to (3), wherein the control unit causes the base station for the first cell to notify the terminal apparatus that new access is barred in the frequency band.

(5)

The communication control apparatus according to (3) or (4), wherein the terminal apparatus is capable of radio communication by using one primary frequency band and one or more secondary frequency bands, and wherein the frequency band is used as the primary frequency band or the secondary frequency bands.

(6)

The communication control apparatus according to (5), wherein the control unit causes the base station for the first cell to perform handover of the terminal apparatus to another frequency band, the terminal apparatus using the frequency band as the primary frequency band.

(7)

The communication control apparatus according to (5) or (6), wherein the control unit causes the base station for the first cell to stop allocating a communication resource to the terminal apparatus using the frequency band as the secondary frequency band.

(8)

The communication control apparatus according to any one of (4) to (7), wherein the control unit causes the base station for the first cell to update linkage between the frequency band and another frequency band having a link direction different from a link direction of the frequency band.

(9)

The communication control apparatus according to any one of (2) to (8), wherein, when it is determined that the second operator is allowed to use the frequency band of a first cell of the first operator, the frequency band is used by a base station for a second cell of the second operator for communication with a terminal apparatus of the second operator, the second cell overlapping with the first cell at least in part, and wherein a base station of the first operator and a base station of the second operator transmit and receive information for reducing interference in the frequency band via an interface between the base station of the first operator and the base station of the second operator.

(10)

The communication control apparatus according to (9), wherein the information for reducing interference in the frequency band includes information indicating which of partial bands included in the frequency band has a communication resource allocated to a terminal apparatus positioned at an end of a cell.

(11)

The communication control apparatus according to any one of (2) to (8), wherein, when it is determined that the second operator is allowed to use the frequency band of the first cell of the first operator, the frequency band is used by a base station for the first cell for communication with a terminal apparatus of the second operator.

(12)

The communication control apparatus according to any one of (1) to (11), wherein the use status of the frequency band is a measured value or an actual value of at least one value of a number of terminal apparatuses connected to the frequency band, a number of terminal apparatuses trying to connect to the frequency band, a use ratio of a communication resource in the frequency band and a traffic volume in the frequency band, or a value derived from the measured value or the actual value.

(13)

The communication control apparatus according to any one of (1) to (11), wherein the use status of the frequency band indicates whether new access of a terminal apparatus is barred in the frequency band.

(14)

The communication control apparatus according to any one of (1) to (13), wherein the acquisition unit acquires further determination information indicating a result obtained by determining, on the basis of a use status of another frequency band owned by the second operator, whether the second operator needs to use a further frequency band, and wherein the determination unit determines whether the second operator is allowed to use the frequency band on the basis of the determination information and the further determination information.

(15)

The communication control apparatus according to any one of (1) to (14), wherein the frequency band includes one or more component carriers, wherein the acquisition unit acquires determination information on each of the component carriers owned by the first operator, the determination information on each of the component carriers indicating a result obtained by determining, on the basis of a use status of each of the one or more component carriers, whether it is possible for another operator to use each of the one or more component carriers, and wherein the determination unit determines which of the one or more component carriers the second operator is allowed to use on the basis of the acquired determination information on each of the component carriers.

(16)

A base station including:

a radio communication unit configured to wirelessly communicate with a terminal apparatus in a first cell of a first operator by using a frequency band owned by the first operator, the first operator providing a radio communication service; and a control unit configured to, when it is determined whether the second operator is allowed to use the frequency band of each cell on the basis of determination information on each cell indicating a result obtained by determining whether it is possible for another operator to use the frequency band of each cell on the basis of a use status of the frequency band of each cell, and when it is determined that the second operator is allowed to use the frequency band of the first cell, stop use of the frequency band by a terminal apparatus of the first operator in the first cell in accordance with control of a communication control apparatus.

(17)

A terminal apparatus including:

a radio communication unit configured to wirelessly communicate with a base station for a first cell of a first operator in the first cell by using a frequency band owned by the first operator, the first operator providing a radio communication service; and a control unit configured to, when it is determined whether the second operator is allowed to use the frequency band of each cell on the basis of determination information on each cell indicating a result obtained by determining whether it is possible for another operator to use the frequency band of each cell on the basis of a use status of the frequency band of each cell, and when it is determined that the second operator is allowed to use the frequency band of the first cell, stop use of the frequency band in the first cell in accordance with control of the base station.

(18)

A communication control method including:

acquiring determination information indicating a result obtained by determining, on the basis of a use status of a frequency band owned by a first operator, whether it is possible for another operator to use the frequency band, the first operator providing a radio communication service; and determining whether a second operator is allowed to use the frequency band on the basis of the acquired determination information.

(19)

A communication control method including:

wirelessly communicating in a first cell of a first operator by using a frequency band owned by the first operator, the first operator providing a radio communication service;

communicating with a communication control apparatus that determines whether a second operator is allowed to use the frequency band of each cell on the basis of determination information on each cell, the determination information on each cell indicating a result obtained by determining, on the basis of a use status of the frequency band of each cell, whether it is possible for another operator to use the frequency band of each cell; and stopping use of the frequency band by a terminal apparatus of the first operator in the first cell in accordance with control of the communication control apparatus when it is determined that the second operator is allowed to use the frequency band of the first cell.

REFERENCE SIGNS LIST 1 communication system
2, 3 radio communication system
20, 30 cell
21, 31 eNodeB
23, 33 user equipment (UE)
25, 35 frequency band
41, 51 serving gateway (S-GW)
43, 53 packet data network gateway (P-GW)
45, 55 mobility management entity (MME)
100 determination entity
110 network communication unit
120 storage unit
130 control unit
131 resource determination section
133 resource determination information section
135 lease determination section
137 base station controlling section
200 eNodeB
210 radio communication unit
220 network communication unit
230 storage unit
240 control unit
400 user equipment (UE)
410 radio communication unit
420 storage unit
430 control unit

The invention claimed is:

1. A communication control apparatus comprising: an acquisition unit configured to acquire determination information indicating a result obtained by determining, on the basis of a use status of a frequency band owned by a first operator that provides a radio communication service, whether it is possible for another operator to use the frequency band; and a determination unit configured to determine whether a second operator is allowed to use the frequency band on the basis of the acquired determination information; wherein the acquisition unit acquires determination information on each cell indicating a result obtained by determining, on the basis of the use status of the frequency band of each cell, whether it is possible for another operator to use the frequency band of each cell, and wherein the determination unit determines whether the second operator is allowed to use the frequency band of each cell on the basis of the determination information on each cell wherein, when it is determined that the second operator is allowed to use the frequency band of a first cell of the first operator, the frequency band is used by a base station for a second cell of the second operator for communication with a terminal apparatus of the second operator, the second cell overlapping with the first cell at least in part, and wherein a base station for the first cell of the first operator and the base station for the second cell of the second operator transmit and receive information for reducing interference in the frequency band via an interface between the base station of the first operator and the base station of the second operator.

2. The communication control apparatus according to claim 1, further comprising: a control unit configured to, when it is determined that the second operator is allowed to use the frequency band of the first cell of the first operator, cause the base station for the first cell to stop use of the frequency band by a terminal apparatus of the first operator in the first cell.

3. The communication control apparatus according to claim 2,
wherein the control unit causes the base station for the first cell to notify the terminal apparatus that new access is barred in the frequency band.

4. The communication control apparatus according to claim 3,
wherein the control unit causes the base station for the first cell to update linkage between the frequency band and another frequency band having a link direction different from a link direction of the frequency band.

5. The communication control apparatus according to claim 2,
wherein the terminal apparatus is capable of radio communication by using one primary frequency band and one or more secondary frequency bands, and
wherein the frequency band is used as the primary frequency band or the secondary frequency bands.

6. The communication control apparatus according to claim 5,
wherein the control unit causes the base station for the first cell to perform handover of the terminal apparatus to another frequency band, the terminal apparatus using the frequency band as the primary frequency band.

7. The communication control apparatus according to claim 5,
wherein the control unit causes the base station for the first cell to stop allocating a communication resource to the terminal apparatus using the frequency band as the secondary frequency band.

8. The communication control apparatus according to claim 1, wherein the information for reducing interference in the frequency band includes information indicating which of partial bands included in the frequency band has a communication resource allocated to a terminal apparatus positioned at an end of a cell.

9. The communication control apparatus according to claim 1, wherein, when it is determined that the second operator is allowed to use the frequency band of the first cell of the first operator, the frequency band is used by the base station for the first cell for communication with a terminal apparatus of the second operator.

10. The communication control apparatus according to claim 1,
wherein the use status of the frequency band is a measured value or an actual value of at least one value of a number of terminal apparatuses connected to the frequency band, a number of terminal apparatuses trying to connect to the frequency band, a use ratio of a communication resource in the frequency band and a traffic volume in the frequency band, or a value derived from the measured value or the actual value.

11. The communication control apparatus according to claim 1,
wherein the use status of the frequency band indicates whether new access of a terminal apparatus is barred in the frequency band.

12. The communication control apparatus according to claim 1,
wherein the acquisition unit acquires further determination information indicating a result obtained by determining, on the basis of a use status of another frequency band owned by the second operator, whether the second operator needs to use a further frequency band, and
wherein the determination unit determines whether the second operator is allowed to use the frequency band on the basis of the determination information and the further determination information.

13. The communication control apparatus according to claim 1,
wherein the frequency band includes one or more component carriers,
wherein the acquisition unit acquires determination information on each of the component carriers owned by the first operator, the determination information on each of the component carriers indicating a result obtained by determining, on the basis of a use status of each of the one or more component carriers, whether it is possible for another operator to use each of the one or more component carriers, and
wherein the determination unit determines which of the one or more component carriers the second operator is allowed to use on the basis of the acquired determination information on each of the component carriers.

14. A base station comprising: a radio communication unit configured to wirelessly communicate with a terminal apparatus in a first cell of a first operator by using a frequency band owned by the first operator, the first operator providing a radio communication service; and a control unit configured to, when it is determined whether the second operator is allowed to use the frequency band of each cell on the basis of determination information on each cell indicating a result obtained by determining whether it is possible for another operator to use the frequency band of each cell on the basis of a use status of the frequency band of each cell, and when it is determined that the second operator is allowed to use the frequency band of the first cell, stop use of the frequency band by a terminal apparatus of the first operator in the first cell in accordance with control of a communication control apparatus; wherein, when it is determined that the second operator is allowed to use the frequency band of the first cell of the first operator, the frequency band is used by a base station for a second cell of the second operator for communication with a terminal apparatus of the second operator, the second cell overlapping with the first cell at least in part, and wherein a base station for the first cell of the first operator and the base station for the second cell of the second operator transmit and receive information for reducing interference in the frequency band via an interface between the base station of the first operator and the base station of the second operator.

15. A terminal apparatus comprising: a radio communication unit configured to wirelessly communicate with a base station for a first cell of a first operator in the first cell by using a frequency band owned by the first operator, the first operator providing a radio communication service; and a control unit configured to, when it is determined whether the second operator is allowed to use the frequency band of each cell on the basis of determination information on each cell indicating a result obtained by determining whether it is possible for another operator to use the frequency band of each cell on the basis of a use status of the frequency band of each cell, and when it is determined that the second operator is allowed to use the frequency band of the first cell, stop use of the frequency band in the first cell in accordance with control of the base station; wherein, when it is determined that the second operator is allowed to use the frequency band of the first cell of the first operator, the frequency band is used by a base station for a second cell of the second operator for communication with a terminal apparatus of the second operator, the second cell overlapping with the first cell at least in part, and wherein a base station for the first cell of the first operator and the base station for the second cell of the second operator transmit and receive information for reducing interference in the frequency band via an interface between the base station of the first operator and the base station of the second operator.

16. A communication control method comprising: acquiring determination information indicating a result obtained by determining, on the basis of a use status of a frequency band owned by a first operator, whether it is possible for another operator to use the frequency band, the first operator providing a radio communication service; and determining whether a second operator is allowed to use the frequency band on the basis of the acquired determination information; wherein, when it is determined that the second operator is allowed to use the frequency band of a first cell of the first operator, the frequency band is used by a base station for a second cell of the second operator for communication with a terminal apparatus of the second operator, the second cell overlapping with the first cell at least in part, and wherein the base station for the first cell of the first operator and the base station for the second cell of the second operator transmit and receive information for reducing interference in the frequency band via an interface between the base station of the first operator and the base station of the second operator.

* * * * *